United States Patent
Taguchi et al.

(10) Patent No.: US 7,287,848 B2
(45) Date of Patent: Oct. 30, 2007

(54) INK FOR INKJET RECORDING AND METHOD FOR INKJET RECORDING

(75) Inventors: Toshiki Taguchi, Shizuoka (JP); Akio Miyamoto, Shizuoka (JP); Takashi Ozawa, Shizuoka (JP); Manabu Ogawa, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 123 days.

(21) Appl. No.: 10/503,710

(22) PCT Filed: Feb. 6, 2003

(86) PCT No.: PCT/JP03/01253

§ 371 (c)(1), (2), (4) Date: Aug. 6, 2004

(87) PCT Pub. No.: WO03/066757

PCT Pub. Date: Aug. 14, 2003

(65) Prior Publication Data

US 2005/0162492 A1    Jul. 28, 2005

(30) Foreign Application Priority Data

| Feb. 8, 2002 | (JP) | ............................. 2002-032944 |
| Feb. 12, 2002 | (JP) | ............................. 2002-33924 |
| Feb. 12, 2002 | (JP) | ............................. 2002-34065 |
| Feb. 12, 2002 | (JP) | ............................. 2002-34324 |
| Feb. 13, 2002 | (JP) | ............................. 2002-035275 |

(51) Int. Cl.
    *G01D 11/00*       (2006.01)

(52) U.S. Cl. ...................... 347/100; 347/95; 106/31.27

(58) Field of Classification Search ................ 347/100, 347/95, 96, 101; 523/160; 106/31.27, 31.13, 106/31.6

See application file for complete search history.

(56) References Cited

U.S. PATENT DOCUMENTS

| 4,068,085 | A |   | 1/1978 | Ramanathan et al. |
| 5,100,468 | A | * | 3/1992 | Yuasa et al. ............ 106/31.86 |
| 6,200,370 | B1 |   | 3/2001 | Fujiwara et al. |
| 6,297,362 | B1 |   | 10/2001 | Kunde et al. |
| 6,455,679 | B1 |   | 9/2002 | Tateishi et al. |
| 6,489,452 | B1 |   | 12/2002 | Tateishi et al. |
| 2002/0107301 | A1 | * | 8/2002 | Yamanouchi et al. ........ 523/160 |
| 2005/0057629 | A1 | * | 3/2005 | Taguchi et al. ............. 347/100 |
| 2006/0092248 | A1 | * | 5/2006 | Taguchi et al. ............. 347/100 |

FOREIGN PATENT DOCUMENTS

| EP | 00/20161 A2 | 12/1980 |
| EP | 0 346 729 A2 | 12/1989 |
| EP | 1 081 198 A2 | 3/2001 |
| EP | 1 251 154 A1 | 10/2002 |
| JP | 2000-169777 A | 6/2000 |
| JP | 2003-064275 A | 3/2003 |
| WO | WO96/34916 A2 | 11/1996 |
| WO | WO 02/083795 A2 | 10/2002 |

OTHER PUBLICATIONS

Patent Abstracts of Japan—vol. 1998, No. 13 (Seiko Epson Corp).
Supplementary Partial European Search Report dated Mar. 10, 2005.
Kabushiki Kaisha Gijutsu Joho Kyokai, "Ink Jet Kiroku ni okeru Ink•Media•Printer no Kaihatsu Gijutsu", Kazuhiro Takausu, Feb. 1, 2001, p. 4.

* cited by examiner

*Primary Examiner*—Manish S. Shah
(74) *Attorney, Agent, or Firm*—Sughrue Mion, PLLC

(57) ABSTRACT

An inkjet recording ink including an aqueous medium having dissolved or dispersed therein a magenta dye selected from azo dyes, wherein the magenta dye is a dye having an oxidation potential more positive than 1.0 V (vs SCE) and at the same time, a water-miscible organic solvent having a vapor pressure of 2,000 Pa or less at 20° C. is contained; and an inkjet recording method using the ink.

By virtue of such a constitution, an inkjet recording ink and an inkjet recording method are provided, which can ensure high ejection stability, good color hue of the obtained image, no drying of the ink at the ink jet head, excellent fastness to light and water, image quality free from defective such as fineline bleeding under high-humidity condition, and good preservability of the image under severe conditions, and furthermore can ensure high storability and high ejection stability even after aging for a long time or under severe conditions.

20 Claims, No Drawings ically and a tough phenomenon in current inkjet recording.

INK FOR INKJET RECORDING AND METHOD FOR INKJET RECORDING

TECHNICAL FIELD

The present invention relates to an inkjet recording ink capable of providing a high-quality recorded image, exhibiting excellent ejection durability even after long-term aging of the ink solution and ensuring excellent preservability of the obtained image under high-humidity condition, and also relates to an inkjet recording method using the ink.

BACKGROUND ART

Accompanying recent popularization of computers, an inkjet printer is widely used for printing letters or drawing an image on paper, film, cloth or the like not only at offices but also at homes.

The inkjet recording method includes a system of jetting out a liquid droplet by applying a pressure from a piezoelectric element, a system of jetting out a liquid droplet by generating a bubble in the ink under heat, a system of using an ultrasonic wave, and a system of jetting out a liquid droplet by suction using an electrostatic force. The ink used for such inkjet recording includes an aqueous ink, an oily ink and a solid (fusion-type) ink.

Among these inks, an aqueous ink is relatively superior to oily ink or solid (fusion-type) ink in view of production, handleability, odor, safety and the like and therefore, predominating as the inkjet recording ink at present.

The dye used in such an inkjet recording ink is required to have high solubility in a solvent (ink medium), enable high-density recording, provide good color hue, exhibit excellent fastness to light, heat, air, water and chemicals, ensure good fixing to an image-receiving material and less bleeding, give an ink having excellent storability, have high purity and no toxicity, and be available at a low cost.

However, it is very difficult to find out a dye satisfying these requirements in a high level. Among these requirements, good color hue and excellent fastness are conflicting in many cases and regarding the coloring material for magenta ink, a dye satisfying the above-described requirements, particularly a dye satisfying both good magenta color hue and light fastness high enough to endure the oxidative atmosphere, can be hardly obtained.

Accordingly, although various dyes and pigments for inkjet recording have been already proposed and are actually used, a dye satisfying all of the requirements described above is not yet found out at present.

Conventionally well-known dyes and pigments having a color index (C.I.) number can hardly satisfy both color hue and fastness required of the ink for inkjet recording.

As for the dye capable of improving the fastness, azo dyes derived from an aromatic amine and a heterocyclic 5-membered ring amine have been proposed in Patent Document 1. However, these dyes have a problem of bad color reproducibility due to undesirable color hue present in the yellow and cyan regions.

Patent Documents 2 and 3 are disclosing an inkjet recording ink with an attempt to satisfy both color hue and light fastness. However, in use as a water-soluble ink, the dyes used in these patent publications are insufficient in the solubility in water. Also, when the dyes described in these patent publications are used as a water-soluble ink for inkjet recording, there arises a problem in the fastness to humidity and heat.

In order to solve these problems, compounds and ink compositions described in Patent Document 4 have been proposed. Furthermore, an inkjet recording ink using a pyrazolylaniline azo dye for improving the color hue and light fastness is described (Patent Document 5). However, these inkjet recording inks all are insufficient in the color reproducibility and fastness of the image output.

It has been also found that when an image is recorded on an inkjet special glossy paper for photographic image quality and put on a wall in a room, the image preservability is sometimes extremely bad. The present inventors assume that this phenomenon is ascribable to some oxidative gas in air, such as ozone. This phenomenon scarcely occurs when the air flow is shut out, for example, by putting the image in a glass-made frame, but in this case, use conditions are limited.

This phenomenon is outstanding particularly in the case of inkjet special glossy paper for photographic image quality and raises a large problem for current inkjet recording systems where one of important characteristics is the photographic image quality.

Also, as described above, in preparing an ink solution, when only water is used, the penetrability into a medium is bad and the image is not fixed in many cases. In addition, the liquid properties necessary for hitting as an ink are often not satisfied. For solving these problems, a technique of using a water-miscible organic solvent as an auxiliary solvent is commonly employed in this field. However, mere use of a water-miscible organic solvent has been found to cause a problem that the image formed is readily blurred under high-humidity condition or the ejection stability is impaired due to drying of the ink at the inkjet head.

[List of Patent Documents as Related Art]

[Patent Document 1]

JP-A-55-161856 (the term "JP-A" as used herein means an "unexamined published Japanese patent application")

[Patent Document 2] JP-A-61-36362

[Patent Document 3] JP-A-2-212566

[Patent Document 4]

JP-T-11-504958 (the term "JP-T" as used herein means a "published Japanese translation of a PCT patent application")

[Patent Document 5]

Japanese Patent Application No. 2000-80733

An object of the present invention is to provide an inkjet recording ink which is an aqueous ink in view of handleability, odor, safety and the like and which can ensure high ejection stability, good color hue of the obtained image, no drying of the ink at the ink jet head, excellent fastness to light and water, image quality free from defective such as fineline bleeding under high-humidity condition, and good preservability of the image under severe conditions. Another object of the present invention is to provide an inkjet recording ink capable of ensuring high storability and high ejection stability even after aging of the ink for a long time or under severe conditions, and a recording method using the ink.

DISCLOSURE OF THE INVENTION

The objects of the present invention can be attained by the techniques described in the following first to twenty-third embodiments.

A first embodiment relates to an ink for ink jet recording, comprising an aqueous medium and a magenta dye dissolved or dispersed in the aqueous medium, the magenta dye being selected from azo dyes, wherein the magenta dye has an oxidation potential of more positive than 1.0 V (vs SCE) and the ink comprises a water-miscible organic solvent having a vapor pressure of 2,000 Pa or less at 20° C.

A second embodiment relates to an ink for inkjet recording according to the first embodiment, wherein the ink comprises at least one organic solvent having a boiling point of 150° C. or more as the water-miscible organic solvent.

A third embodiment relates to an ink for inkjet recording according to the second embodiment, wherein at least one of the organic solvent having a boiling point of 150° C. or more is an alcohol derivative.

A fourth embodiment relates to an ink for inkjet recording according to the first embodiment, wherein the ink comprises at least one organic solvent having a boiling point of less than 150° C. as the water-miscible organic solvent.

A fifth embodiment relates to an ink for inkjet recording according to the fourth embodiment, wherein at least one of the organic solvent having a boiling point of less than 150° C. is an alcohol derivative.

A sixth embodiment relates to an ink for inkjet recording according to the first embodiment, wherein the ink comprises a polyhydric alcohol and/or a derivative of the polyhydric alcohol as the water-miscible organic solvent.

A seventh embodiment relates to an ink for inkjet recording according to the sixth embodiment, wherein the water-miscible organic solvent comprises a mixture of two or more components, where at least one component comprises the polyhydric alcohol and/or the derivative of the polyhydric alcohol.

An eighth embodiment relates to an ink for inkjet recording according to the sixth or seventh embodiment, wherein said at least one component comprises the polyhydric alcohol and/or the derivative of the polyhydric alcohol at a concentration of 10 to 60 (weight/volume) %.

A ninth embodiment relates to an ink for inkjet recording according to the first embodiment, wherein the ink comprises the water-miscible organic solvent in which the azo dye has a solubility of 10 (g/100 g-solvent) or more at 25° C.

A tenth embodiment relates to an ink for inkjet recording according to the ninth embodiment, wherein the ink comprises the water-miscible organic solvent in an amount of 10 weight % or less, the azo dye having a solubility of 10 (g/100 g-solvent) or more at 25° C. in the water-miscible organic solvent.

An eleventh embodiment relates to an ink for inkjet recording according to the first embodiment, wherein the ink comprises the organic solvent as the water-miscible organic solvent, the organic solvent being liquid at a room temperature and not containing a heteroatom other than an oxygen atom.

A twelfth embodiment relates to an ink for inkjet recording according to the eleventh embodiment, wherein the organic solvent has a boiling point of 150° C. or more.

A thirteenth embodiment relates to an ink for inkjet recording according to the eleventh or twelfth embodiment, wherein the organic solvent is an alcohol derivative selected from a monool, a diol and a triol.

A fourteenth embodiment relates to an ink for inkjet recording according to the first embodiment, wherein the ink comprises a water of from 40 to 80 weight % of a ink solution.

A fifteenth embodiment relates to an ink for inkjet recording according to the first embodiment, wherein the azo dye has an absorption maximum in the spectral region of 500 to 580 nm in the aqueous medium.

A sixteenth embodiment relates to an ink for inkjet recording according to any one of the first to fifteenth embodiments, wherein the azo dye has a chromophore represented by the following formula:

(heterocyclic ring A)-N=N-(heterocyclic ring B)

wherein the heterocyclic ring A and the heterocyclic B may have the same structure.

A seventeenth embodiment relates to an ink for inkjet recording according to any one of the first to sixteenth embodiments, wherein the azo dye has an aromatic nitrogen-containing 6-membered heterocyclic ring directly connected to at least one side of an azo group as a coupling component.

An eighteenth embodiment relates to an ink for inkjet recording according to any one of the first to seventeenth embodiments, wherein the azo dye has one of an aromatic ring amino group and a heterocyclic amino group-containing structure as an auxochrome.

A nineteenth embodiment relates to an ink for inkjet recording according to any one of the first to eighteenth embodiments, wherein the azo dye has a stereo structure.

A twentieth embodiment relates to an ink for inkjet recording according to any one of the first to eighteenth embodiments, wherein the azo dye is a dye represented by the following formula (1):

Formula (1):

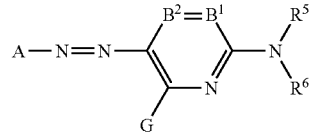

wherein A represents a 5-membered heterocyclic group;

$B^1$ and $B^2$ each represents =CR$^1$— or —CR$^2$= or either one of $B^1$ and $B^2$ represents a nitrogen atom and other represents =CR$^1$— or —CR$^2$=;

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

A twenty-first embodiment relates to an ink for inkjet recording according to any one of the first to twentieth embodiments, wherein the ink has an ozone fading rate constant of a recorded image of $5.0 \times 10^{-2}$ [hour$^{-1}$] or less.

A twenty-second embodiment relates to a method for inkjet recording using the ink for inkjet recording according to any one of the first to twenty-first embodiments.

A twenty-third embodiment relates to a method for inkjet recording, comprising steps of: ejecting an ink droplet in accordance with a recording signal on an image-receiving material, the image-receiving material comprising an image-receiving layer that contains a white inorganic pigment particle on a support; and recording an image on the image-receiving material, wherein the ink droplet is the ink for inkjet recording according to any one of the first to twenty-first embodiments.

The present invention is described in detail below.

As a result of intensive investigations on the inkjet recording ink, the present inventors have found that the properties required of the dye are 1) to give a good color hue and be free of change in the color hue (chromism of solvate), 2) to exhibit excellent fastness (to light, ozone, NOx, solvent, oil and water), 3) to be safe (not carcinogenic by AMES, not irritating to skin and easily degradable), 4) to be inexpensive, 5) to have high ε, 6) to be highly soluble, and 7) to have strong fixing property to a medium.

The properties required of the ink and conc. ink are 1) to be uniform irrespective of the temperature and aging, 2) to be less contaminated, 3) to exhibit good penetration into a medium, 4) to be uniform in the hitting size, 5) to be usable for all types of paper, 6) to be easily prepared, 7) to ensure no ejection error, less bubbling and easy defoaming, and 8) to be stably ejected.

The properties required of the image is 1) to be clear without bleeding, fading and beading, 2) to have scratch resistance, 3) to have high and uniform gloss, 4) to have good image preservability and excellent balance in color fading, 5) to be quickly dried, 6) to be printed at a high speed, and 7) to have no image density dependency in the color fading ratio.

Specific embodiments of the present invention are described in detail below.

[Magenta Dye]

In order to satisfy the objective properties of the present invention, the image recording is performed by using a dye having properties specified in 1 and 15 to 21 for the magenta ink. Accordingly, these properties of the magenta dye are described below.

In the magenta ink used for the inkjet recording ink of the present invention, a magenta dye selected from azo dyes is dissolved or dispersed in an aqueous medium and this dye is fundamentally characterized in that the absorption maximum in the aqueous medium is present in the spectral region of 500 to 580 nm and the oxidation potential is more positive than 1.0 V (vs SCE).

The first preferred structural feature of this azo dye is that the dye has a chromophore represented by the formula: (heterocyclic ring A)-N=N-(heterocyclic ring B). In this case, the heterocyclic rings A and B may have the same structure. Specifically, the heterocyclic rings A and B each is a 5- or 6-membered heterocyclic ring selected from pyrazole, imidazole, triazole, oxazole, thiazole, selenazole, pyridone, pyrazine, pyrimidine and pyridine. These are specifically described, for example, in Japanese Patent Application Nos. 2000-15853 and 2001-15614, JP-A-2002-309116 and Japanese Patent Application No. 2001-195014.

The second preferred structural feature of the azo dye is that an aromatic nitrogen-containing 6-membered heterocyclic ring is connected as a coupling component directly to at least one side of the azo group. Specific examples thereof are described in 2001-110457.

The third preferred structural feature is that the auxochrome has an aromatic ring amino group or heterocyclic amino group structure, specifically, an anilino group or a heterylamino group.

The fourth preferred structural feature is that the dye has a stereo structure. This is specifically described in Japanese Patent Application No. 2002-12015.

Among these preferred structural features of the azo dye, the dye most preferred for achieving the objects of the present invention is a dye represented by the following Formula (1):

Formula (1):

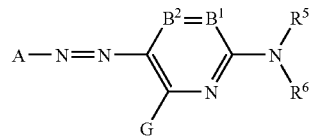

wherein A represents a 5-membered heterocyclic group;

$B^1$ and $B^2$ each represents =CR$^1$— or —CR$^2$= or either one of $B^1$ and $B^2$ represents a nitrogen atom and the other represents =CR$^1$— or —CR$^2$=;

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

The dye of formula (1) is described in more detail.

In formula (1), A represents a 5-membered heterocyclic group. Examples of the heteroatom of the heterocyclic ring include N, O and S. A is preferably a nitrogen-containing 5-membered heterocyclic ring and the heterocyclic ring may be condensed with an aliphatic ring, an aromatic ring or another heterocyclic ring. Preferred examples of the heterocyclic ring represented by A include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among these rings, more preferred are a pyrazole ring, an imidazole ring, an isothiazole ring, a thiadiazole ring and a benzothiazole ring represented by the following formulae (a) to (f):

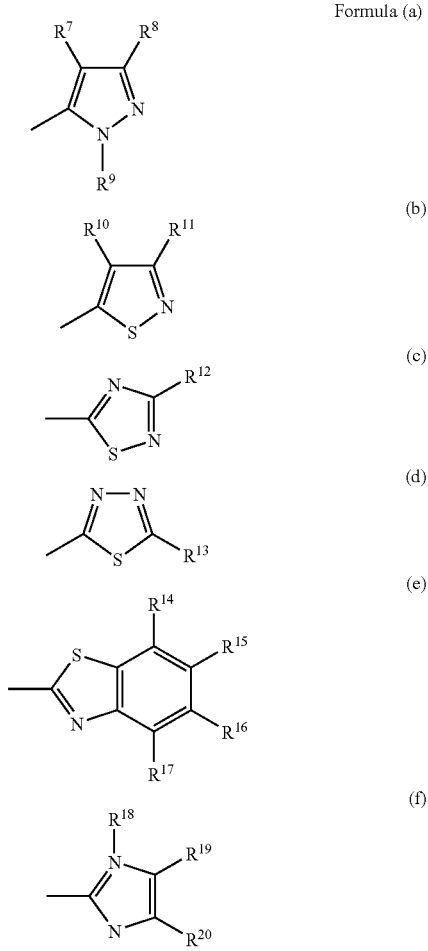

wherein $R^7$ to $R^{20}$ each represents the same substituent as G, $R^1$ and $R^2$ in formula (1).

Among formulae (a) to (f), preferred are a pyrazole ring and an isothiazole ring represented by formulae (a) and (b), and most preferred is a pyrazole ring represented by formula (a).

In formula (1), $B^1$ and $B^2$ each represents =$CR^1$— or —$CR^2$= or either one of $B^1$ and $B^2$ represents a nitrogen atom and the other represents =$CR^1$— or —$CR^2$=. $B^1$ and $B^2$ each preferably represents =$CR^1$— or —$CR^2$=.

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted.

$R^5$ and $R^6$ each is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and the hydrogen atom of each substituent may be substituted, but $R^5$ and $R^6$ are not a hydrogen atom at the same time.

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted.

G is preferably a hydrogen atom, a halogen atom, an aliphatic group, an aromatic group, a hydroxy group, an alkoxy group, an aryloxy group, an acyloxy group, a heterocyclic oxy group, an amino group, an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group or an acylamino group, and most preferably a hydrogen atom, an amino group (preferably an anilino group) or an acylamino group, and the hydrogen atom of each substituent may be substituted.

$R^1$ and $R^2$ each is preferably a hydrogen atom, an alkyl group, a halogen atom, an alkoxycarbonyl group, a carboxyl group, a carbamoyl group, a hydroxy group, an alkoxy group or a cyano group, and the hydrogen atom of each substituent may be substituted.

$R^1$ and $R^5$, or $R^5$ and $R^6$ may combine to form a 5- or 6-membered ring.

When A has a substituent or when the substituent $R^1$, $R^2$, $R^5$, $R^6$ or G further has a substituent, examples of the substituent include the substituents described above for G, $R^1$ and $R^2$.

In the case where the dye of the present invention is a water-soluble dye, the dye preferably has further an ionic hydrophilic group as a substituent on any position of A, $R^1$, $R^2$, $R^5$, $R^6$ and G. Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

The terms (substituents) used in the present invention are described below. These terms each is common among different symbols in formula (1) and also in formula (1a) shown later.

The halogen atom includes a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group and a substituted aralkyl group. The "substituted" used for a "substituted alkyl group" and the like in the present invention means that the hydrogen atom present in an "alkyl group" or the like is substituted, for example, by a substituent described above for G, $R^1$ and $R^2$.

The aliphatic group may be branched or may form a ring. The number of carbon atoms in the aliphatic group is preferably from 1 to 20, more preferably from 1 to 16. The aryl moiety in the aralkyl group and the substituted aralkyl group is preferably a phenyl group or a naphthyl group, more preferably a phenyl group. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, more preferably a phenyl group. The number of carbon atoms in the aromatic group is preferably from 6 to 20, more preferably from 6 to 16.

Examples of the aromatic group include a phenyl group, a p-tolyl group, a p-methoxyphenyl group, an o-chlorophenyl group and an m-(3-sulfopropylamino)phenyl group.

The heterocyclic group includes a substituted heterocyclic group. In the heterocyclic group, the heterocyclic ring may be condensed with an aliphatic ring, an aromatic ring or another heterocyclic ring. The heterocyclic group is preferably a 5- or 6-membered heterocyclic group. Examples of the substituent of the substituted heterocyclic group include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent therefor include an alkyl group. Examples of the carbamoyl group include a methylcarbamoyl group and a dimethylcarbamoyl group.

The alkoxycarbonyl group includes a substituted alkoxycarbonyl group. The alkoxycarbonyl group is preferably an alkoxycarbonyl group having from 2 to 20 carbon atoms. Examples of the substituent of the substituted alkoxycarbonyl group include an ionic hydrophilic group. Examples of the alkoxycarbonyl group include a methoxycarbonyl group and an ethoxycarbonyl group.

The aryloxycarbonyl group includes a substituted aryloxycarbonyl group. The aryloxycarbonyl group is preferably an aryloxycarbonyl group having from 7 to 20 carbon atoms. Examples of the substituent of the substituted aryloxycarbonyl group include an ionic hydrophilic group. Examples of the aryloxycarbonyl group include a phenoxycarbonyl group.

The heterocyclic oxycarbonyl group includes a substituted heterocyclic oxycarbonyl group. Examples of the heterocyclic ring include the heterocyclic rings described above for the heterocyclic group. The heterocyclic oxycarbonyl group is preferably a heterocyclic oxycarbonyl group having from 2 to 20 carbon atoms. Examples of the substituent of the substituted heterocyclic oxycarbonyl group include an ionic hydrophilic group. Examples of the heterocyclic oxycarbonyl group include a 2-pyridyloxycarbonyl group.

The acyl group includes a substituted acyl group. The acyl group is preferably an acyl group having from 1 to 20 carbon atoms. Examples of the substituent of the substituted acyl group include an ionic hydrophilic group. Examples of the acyl group include an acetyl group and a benzoyl group.

The alkoxy group includes a substituted alkoxy group. The alkoxy group is preferably an alkoxy group having from 1 to 20 carbon atoms. Examples of the substituent of the substituted alkoxy group include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group. The aryloxy group is preferably an aryloxy group having from 6 to 20 carbon atoms. Examples of the substituent of the substituted aryloxy group include an alkoxy group and an ionic hydrophilic group. Examples of the aryloxy group include a phenoxy group, a p-methoxyphenoxy group and an o-methoxyphenoxy group.

The heterocyclic oxy group includes a substituted heterocyclic oxy group. Examples of the heterocyclic ring include the heterocyclic rings described above for the heterocyclic group. The heterocyclic oxy group is preferably a heterocyclic oxy group having from 2 to 20 carbon atoms. Examples of the substituent of the substituted heterocyclic oxy group include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes a substituted acyloxy group. The acyloxy group is preferably an acyloxy group having from 1 to 20 carbon atoms. Examples of the substituent of the substituted acyloxy group include an ionic hydrophilic group. Examples of the acyloxy group include an acetoxy group and a benzoyloxy group.

The carbamoyloxy group includes a substituted carbamoyloxy group. Examples of the substituent therefor include an alkyl group. Examples of the carbamoyloxy group include an N-methylcarbamoyloxy group.

The alkoxycarbonyloxy group includes a substituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes a substituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes a substituted amino group. Examples of the substituent therefor include an alkyl group, an aryl group and a heterocyclic group, and the alkyl group, the aryl group and the heterocyclic group each may further have a substituent. The alkylamino group includes a substituted alkylamino group. The alkylamino group is preferably an alkylamino group having from 1 to 20 carbon atoms. Examples of the substituent of the substituted alkylamino group include an ionic hydrophilic group. Examples of the alkylamino group include a methylamino group and a diethylamino group.

The arylamino group includes a substituted arylamino group. The arylamino group is preferably an arylamino group having from 6 to 20 carbon atoms. Examples of the substituent of the substituted arylamino group include a halogen atom and an ionic hydrophilic group. Examples of the arylamino group include a phenylamino group and a 2-chlorophenylamino group.

The heterocyclic amino group includes a substituted heterocyclic amino group. Examples of the heterocyclic ring include the heterocyclic rings described above for the heterocyclic group. The heterocyclic amino group is preferably a heterocyclic amino group having from 2 to 20 carbon atoms. Examples of the substituent of the substituted heterocyclic amino group include an alkyl group, a halogen atom and an ionic hydrophilic group.

The acylamino group includes a substituted acylamino group. The acylamino group is preferably an acylamino group having from 2 to 20 carbon atoms. Examples of the substituent of the substituted acylamino group include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group. The ureido group is preferably a ureido group having from 1 to 20 carbon atoms. Examples of the substituent of the substituted ureido group include an alkyl group and an aryl group. Examples of the ureido group include a 3-methylureido group, a 3,3-dimethylureido group and a 3-phenylureido group.

The sulfamoylamino group includes a substituted sulfamoylamino group. Examples of the substituent therefor include an alkyl group. Examples of the sulfamoylamino group include an N,N-dipropylsulfamoylamino group.

The alkoxycarbonylamino group includes a substituted alkoxycarbonylamino group. The alkoxycarbonylamino group is preferably an alkoxycarbonylamino group having from 2 to 20 carbon atoms. Examples of the substituent of the substituted alkoxycarbonylamino group include an ionic hydrophilic group. Examples of the alkoxycarbonylamino group include an ethoxycarbonylamino group.

The aryloxycarbonylamino group includes a substituted aryloxycarbonylamino group. The aryloxycarbonylamino group is preferably an aryloxycarbonylamino group having from 7 to 20 carbon atoms. Examples of the substituent of the substituted aryloxycarbonylamino group include an ionic hydrophilic group. Examples of the aryloxycarbonylamino group include a phenoxycarbonylamino group.

The alkylsulfonylamino group and the arylsulfonylamino group include a substituted alkylsulfonylamino group and a substituted arylsulfonylamino group, respectively. The alkylsulfonylamino group and the arylsulfonylamino group are preferably an alkylsulfonylamino group having from 1 to 20 carbon atoms and an arylsulfonylamino group having from 7 to 20 carbon atoms, respectively. Examples of the substituent of the substituted alkylsulfonylamino group and substituted arylsulfonylamino group include an ionic hydrophilic group. Examples of the alkylsulfonylamino group and arylsulfonylamino group include a methylsufonylamino group, an N-phenyl-methylsulfonylamino group, a phenylsulfonylamino group and a 3-carboxyphenyl-sulfonylamino group.

The heterocyclic sulfonylamino group includes a substituted heterocyclic sulfonylamino group. Examples of the heterocyclic ring include the heterocyclic rings described above for the heterocyclic group. The heterocyclic sulfonylamino group is preferably a heterocyclic sulfonylamino group having from 1 to 12 carbon atoms. Examples of the substituent of the substituted heterocyclic sulfonylamino group include an ionic hydrophilic group. Examples of the heterocyclic sulfonylamino group include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group, respectively. Examples of the heterocyclic ring include the heterocyclic rings described above for the heterocyclic group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms, respectively. Examples of the substituent of the substituted alkylthio group, substituted arylthio group and substituted heterocyclic thio group include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include a substituted alkylsulfonyl group and a substituted arylsulfonyl group, respectively. Examples of the alkylsulfonyl group and arylsulfonyl group include a methylsulfonyl group and a phenylsulfonyl group.

The heterocyclic sulfonyl group includes a substituted heterocyclic sulfonyl group. Examples of the heterocyclic ring include the heterocyclic rings described above for the heterocyclic group. The heterocyclic sulfonyl group is preferably a heterocyclic sulfonyl group having from 1 to 20 carbon atoms. Examples of the substituent of the substituted heterocyclic sulfonyl group include an ionic hydrophilic group. Examples of the heterocyclic sulfonyl group include a 2-thienylsulfonyl group and a 3-pyridylsulfonyl group.

The alkylsulfinyl group and the arylsulfinyl group include a substituted alkylsulfinyl group and a substituted arylsulfinyl group, respectively. Examples of the alkylsulfinyl group and arylsulfinyl group include a methylsulfinyl group and a phenylsulfinyl group.

The heterocyclic sulfinyl group includes a substituted heterocyclic sulfinyl group. Examples of the heterocyclic ring include the heterocyclic rings described above for the heterocyclic group. The heterocyclic sulfinyl group is preferably a heterocyclic sulfinyl group having from 1 to 20 carbon atoms. Examples of the substituent of the substituted heterocyclic sulfinyl group include an ionic hydrophilic group. Examples of the heterocyclic sulfinyl group include a 4-pyridylsulfinyl group.

The sulfamoyl group includes a substituted sulfamoyl group. Examples of the substituent therefor include an alkyl group. Examples of the sulfamoyl group include a dimethylsulfamoyl group and a di-(2-hydroxyethyl)sulfamoyl group.

Among the dyes represented by formula (1), particularly preferred is a structure represented by the following formula (1a):

Formula (1a):

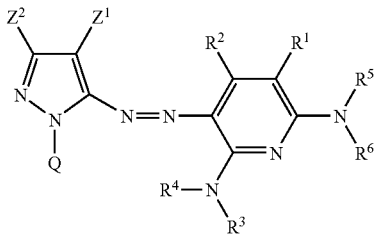

In formula (1a), $R^1$, $R^2$, $R^5$ and $R^6$ have the same meanings as in formula (1).

$R^3$ and $R^4$ each independently represents a hydrogen atom or a substituent and the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each is preferably a hydrogen atom, an aromatic group, a heterocyclic group, an acyl group, an alkylsulfonyl group or an arylsulfonyl group, more preferably a hydrogen atom, an aromatic group or a heterocyclic group.

$Z^1$ represents an electron-withdrawing group having a Hammett's substituent constant σp value of 0.20 or more. $Z^1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$Z^2$ represents a hydrogen atom or a substituent and the substituent is an aliphatic group, an aromatic group or a heterocyclic group. $Z^2$ is preferably an aliphatic group, more preferably an alkyl group having from 1 to 6 carbon atoms.

Q represents a hydrogen atom or a substituent and the substituent is an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the ring structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benz- imidazole ring, an oxazole ring, a benzoxazole ring, a thiazole ring, a benzothiazole ring, an oxane ring, a sulfolane ring and a thiane ring.

The hydrogen atom of each substituent described in regard to formula (1a) may be substituted. Examples of the substituent include the substituents described in regard to formula (1), the groups described as examples for G, $R^1$ and $R^2$, and ionic hydrophilic groups.

Here, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki (Chemistry Region)*, special number, No. 122, pp. 96–103, Nankodo (1979). In the present invention, each substituent is limited or described by using the Hammett's substituent constant σp but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formula (1a) of the present invention include those which are not a benzene derivative, the σp value is used as a measure for showing the electron effect of the substituent irrespective of the substitution site. In the present invention, the σp value is used in such a meaning.

Examples of the electron-withdrawing group having a Hammett's substituent constant σp value of 0.60 or more include a cyano group, a nitro group, an alkylsulfonyl group (e.g., methylsulfonyl) and an arylsulfonyl group (e.g., phenylsulfonyl).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

The preferred combination of substituents in the azo dye represented by formula (1) is described below. $R^5$ and $R^6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R^5$ and $R^6$ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ each is preferably =$CR^1$— or —$CR^2$=, and $R^1$ and $R^2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (1) are shown in (Table 1) to (Table 13) below, but the azo dye for use in the present invention is not limited to those shown below.

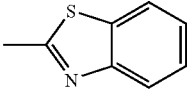

| Dye | $R_1$ | $R_2$ | $R_3$ |
|---|---|---|---|
| a-1 | 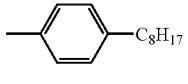 | 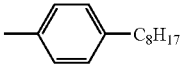 | 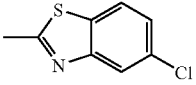 |
| a-2 | 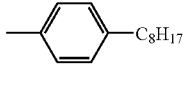 | 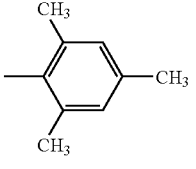 | 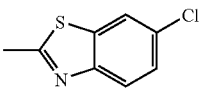 |
| a-3 | 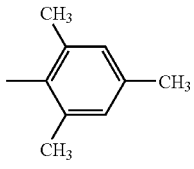 | 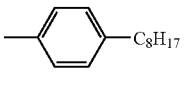 | 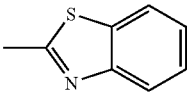 |
| a-4 | 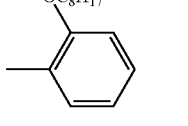 | 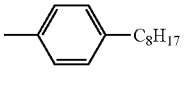 | 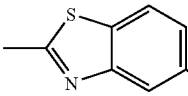 |
| a-5 | 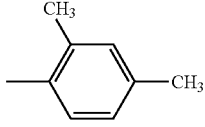 | 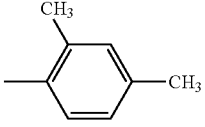 | 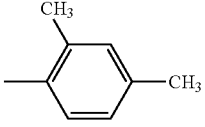 |

-continued
| | | | | |
|---|---|---|---|---|
| a-6 | 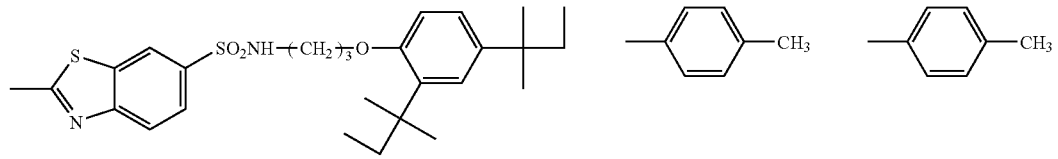 | | | |
| a-7 | 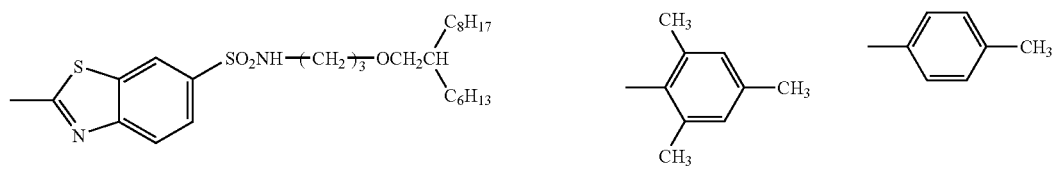 | | | |
| a-8 | 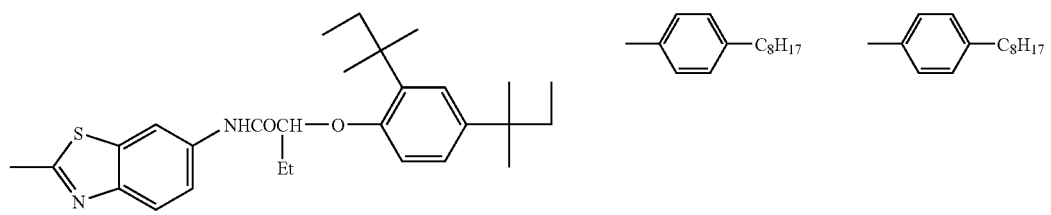 | | | |
| a-9 | 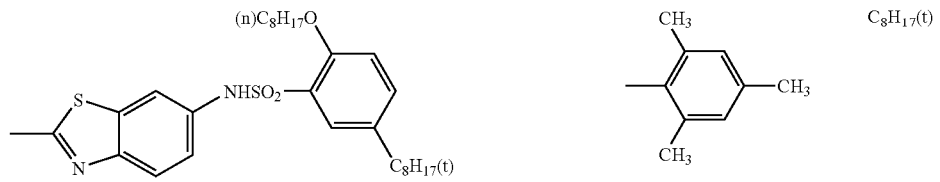 | | | |
| a-10 |  | | | |
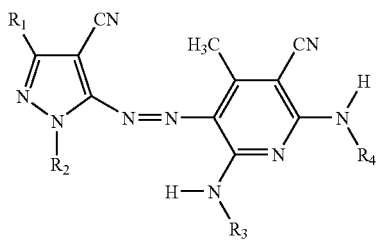
| Dye | $R_1$ | $R_2$ | $R_3$ | $R_4$ |
|---|---|---|---|---|
| a-11 | | | | |
| a-12 | | | | |
| a-13 | | | | |
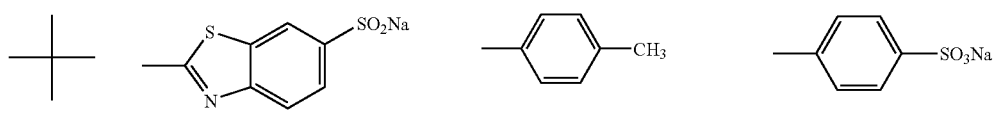
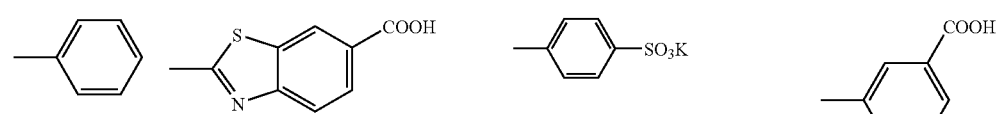
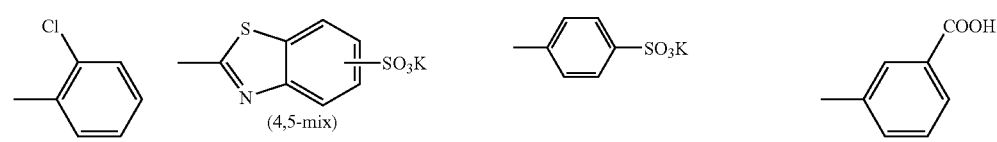

-continued
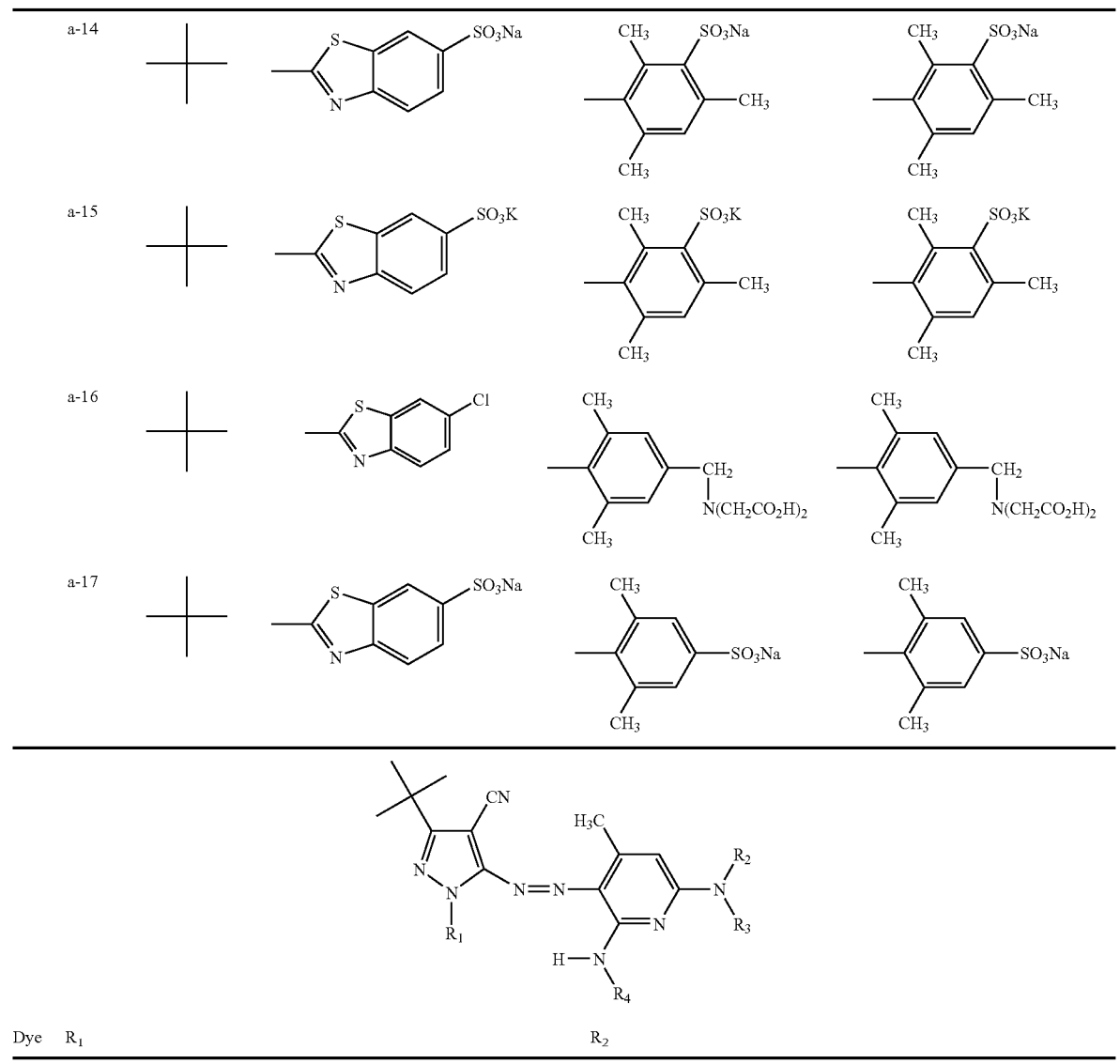
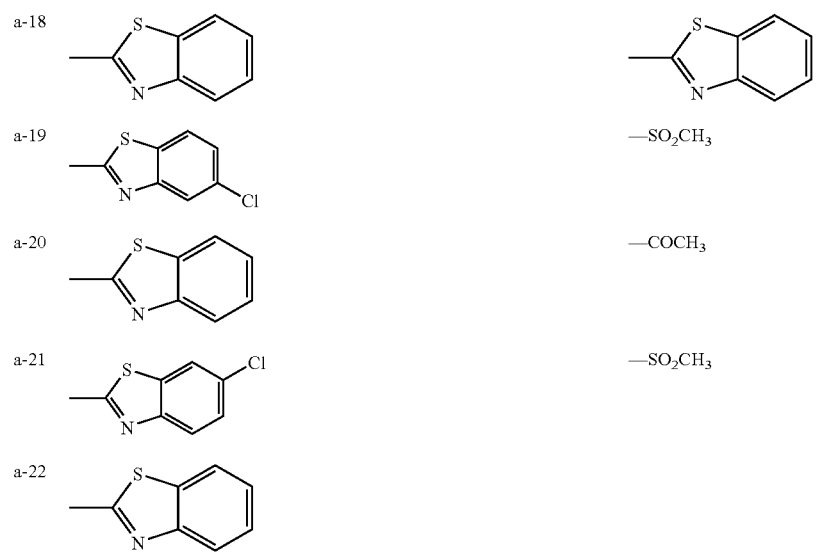

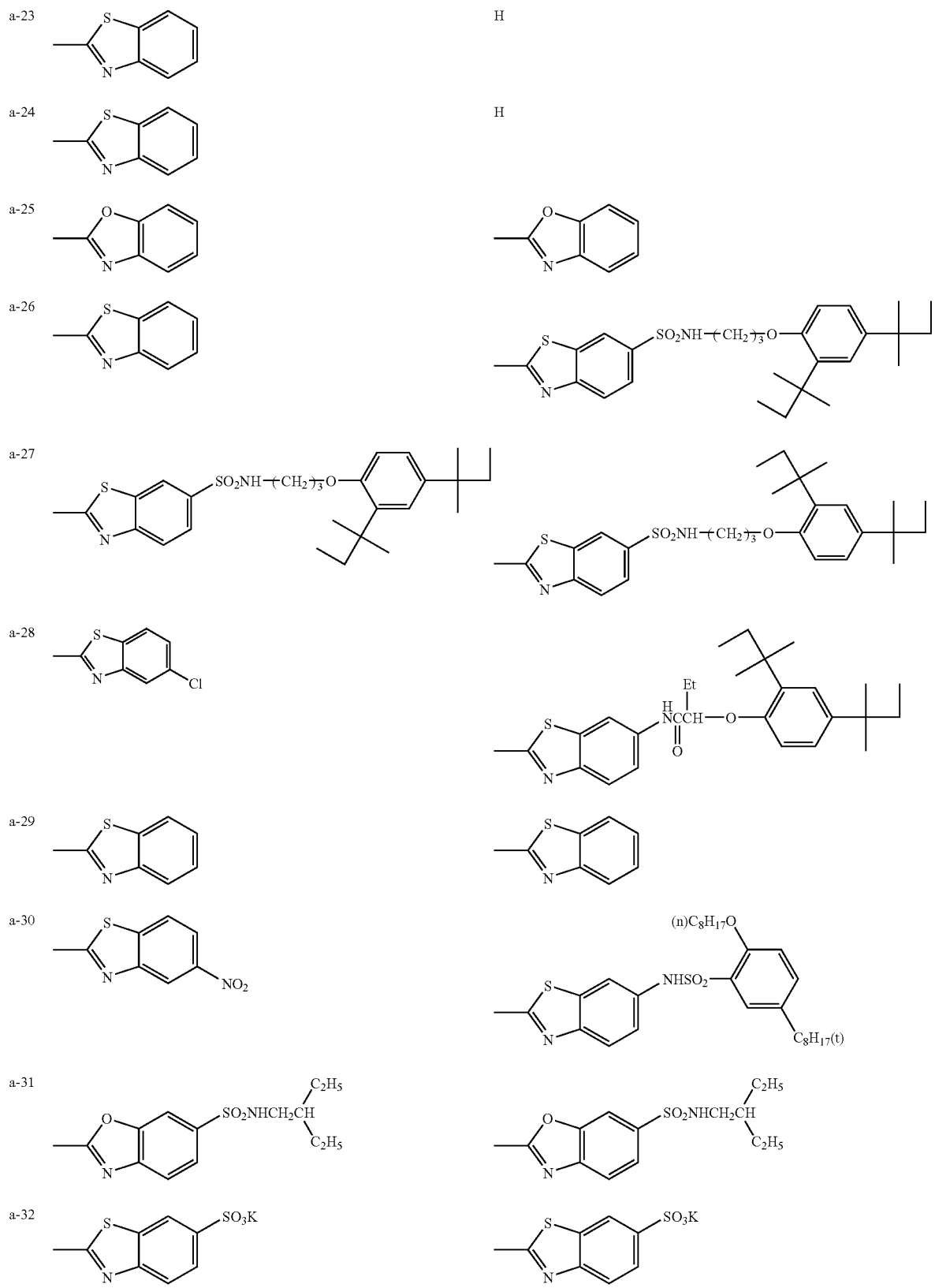

-continued
a-33 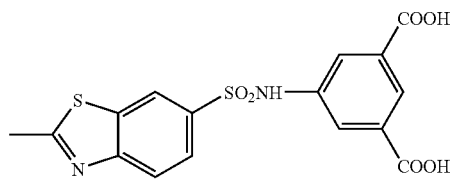 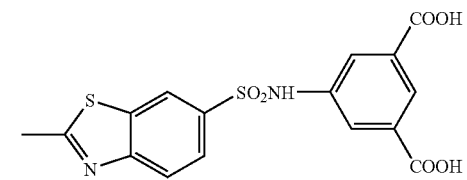
a-34 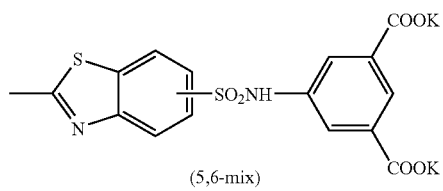
(5,6-mix)
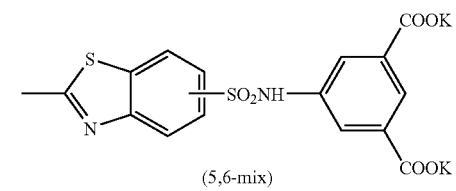
(5,6-mix)
a-35 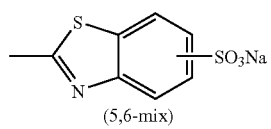
(5,6-mix)
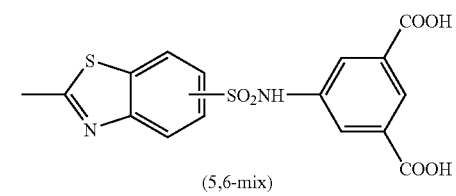
(5,6-mix)
a-36 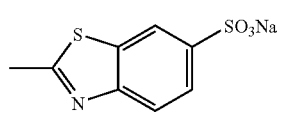
a-37 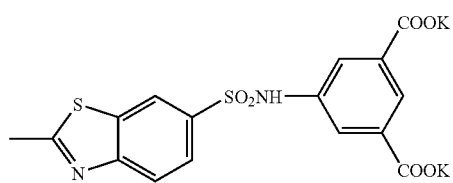
a-38 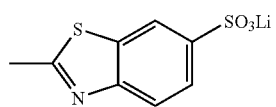
a-39 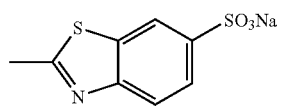
a-40 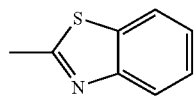
| Dye | R₃ | R₄ |
|---|---|---|
| a-18 | 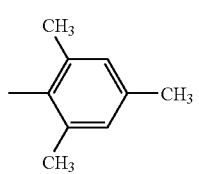 | 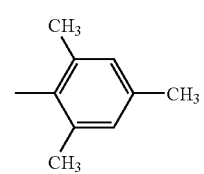 |

-continued
| | | |
|---|---|---|
| a-19 | 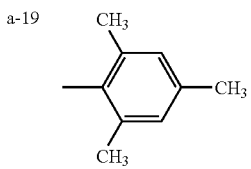 | 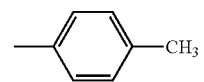 |
| a-20 | C$_8$H$_{17}$(t) | C$_8$H$_{17}$(t) |
| a-21 | 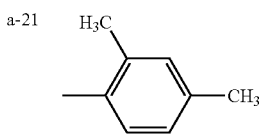 | C$_8$H$_{17}$(t) |
| a-22 | 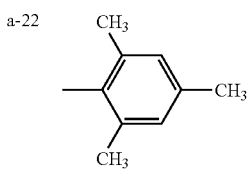 | 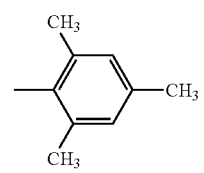 |
| a-23 | 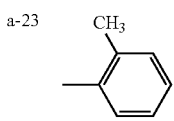 | 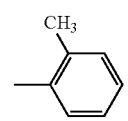 |
| a-24 | 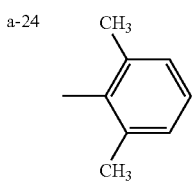 | 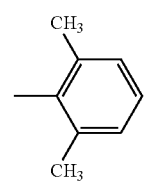 |
| a-25 | 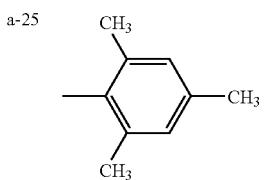 | 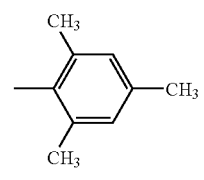 |
| a-26 | 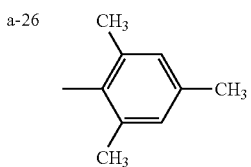 | 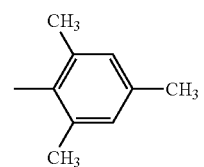 |
| a-27 | 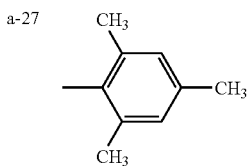 | 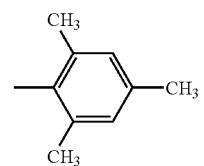 |
| a-28 | 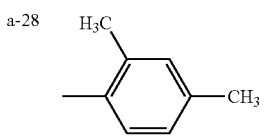 | 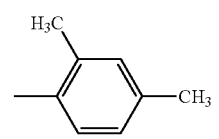 |

-continued
| | | |
|---|---|---|
| a-29 | 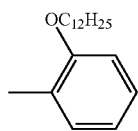 | 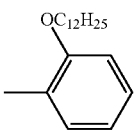 |
| a-30 | 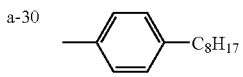 | $C_8H_{17}(t)$ |
| a-31 | 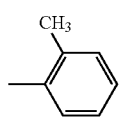 | 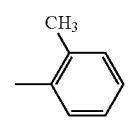 |
| a-32 | 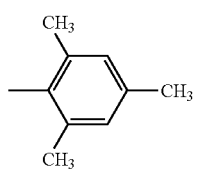 | 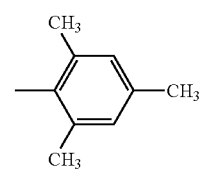 |
| a-33 | 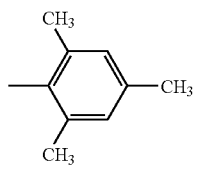 | 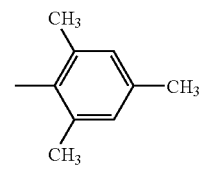 |
| a-34 | 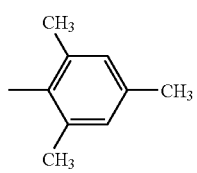 | 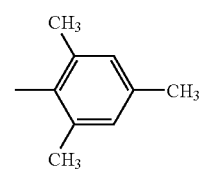 |
| a-35 | 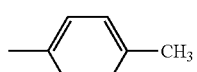 | 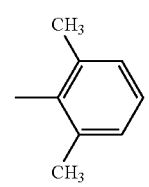 |
| a-36 | 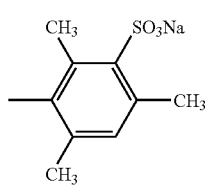 | 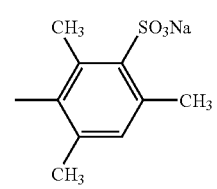 |
| a-37 | 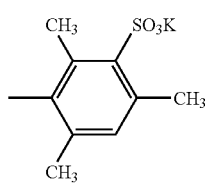 | 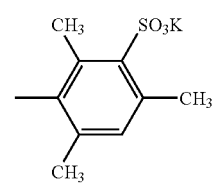 |

-continued
| | | |
|---|---|---|
| a-38 | 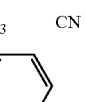 | 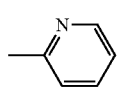 |
| a-39 | 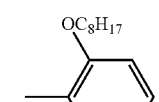 | 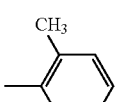 |
| a-40 | 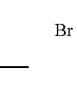 | 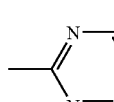 |
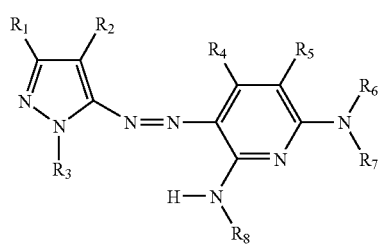
| Dye | $R_1$ | $R_2$ | $R_3$ | $R_4$ | $R_5$ | $R_6$ | $R_7$ | $R_8$ |
|---|---|---|---|---|---|---|---|---|
| a-41 | 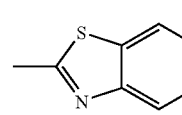 | CN | 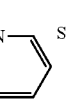 | H | $CONH_2$ | $SO_2CH_3$ | 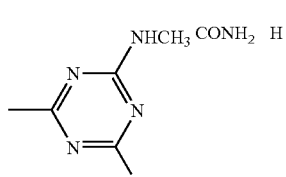 | 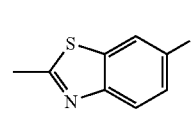 |
| a-42 | 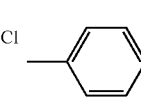 | Br | 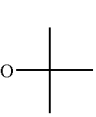 | COOEt | H | 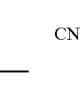 | $C_8H_{17}(t)$ | $COCH_3$ |
| a-43 | 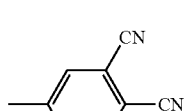 | $SO_2CH_3$ | 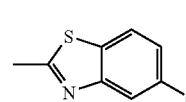 | $CONH_2$ | H | 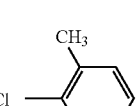 | 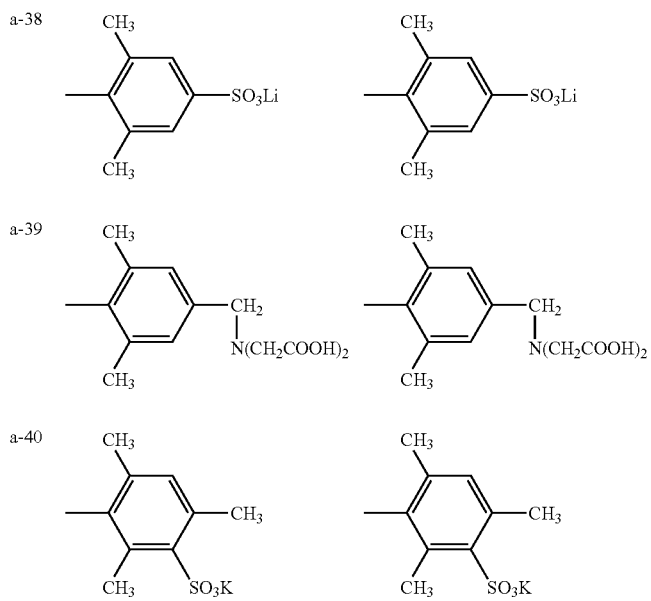 | |
| a-44 | | CN | | CN | H | | $CH_3$ | $SO_2CH_3$ |

-continued
| | | | | | | | |
|---|---|---|---|---|---|---|---|
| a-45 |  | Br |  | H | CONH₂  |  |  |
| a-46 |  | CN |  | H | 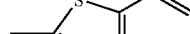 |  |  |
| Dye | R₁ | R₂ | R₃ | R₄ | R₅ | R₆ |
|---|---|---|---|---|---|---|
| b-1 | CH₃ | CH₃ | CN | H | 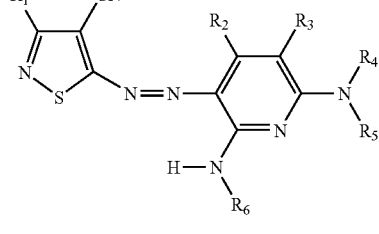 | 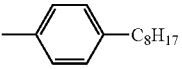 |
| b-2 | CH₃ | CH₃ | CN | H |  | 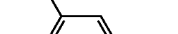 |
| b-3 | CH₃ | CH₃ | CONH₂ | H | 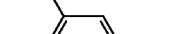 |  |
| b-4 | CH₃ | CH₃ | H | H | 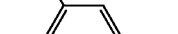 | 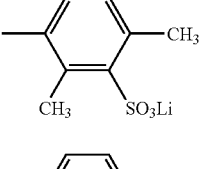 |
| b-5 | CH₃ | H | CN | H | 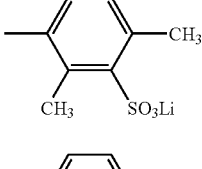 | 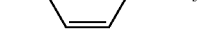 |
| b-6 | CH₃ | CH₃ | H | 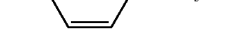 | 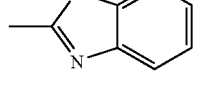 | 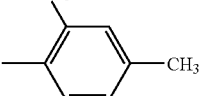 |

-continued
| | | | | | | | |
|---|---|---|---|---|---|---|---|
| b-7 | CH₃ | CH₃ | H | 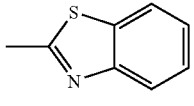 | 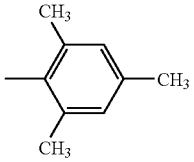 | | 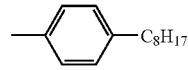 |
| b-8 | CH₃ | H | H | SO₂CH₃ | 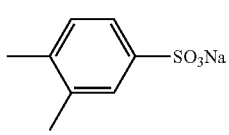 | | 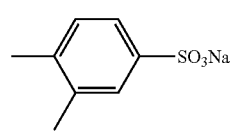 |
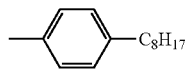
| Dye | R₁ | R₂ | R₃ | R₄ | R₅ | R₆ |
|---|---|---|---|---|---|---|
| c-1 | —SCH₃ | CH₃ | CN | H | C₈H₁₇(t) | 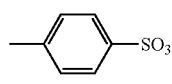 |
| c-2 | 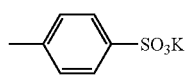 | H | CONH₂ | H | 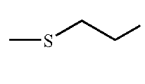 | 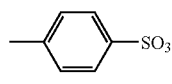 |
| c-3 | 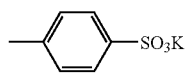 | CH₃ | H | 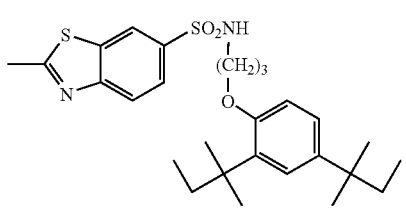 | 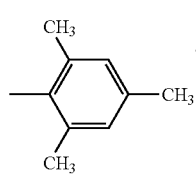 | 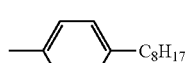 |
| c-4 | —CH₃ | CH₃ | H | 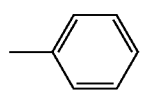 | 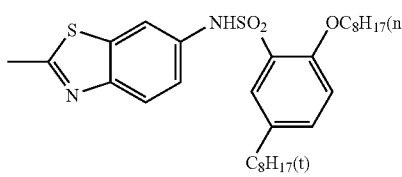 | 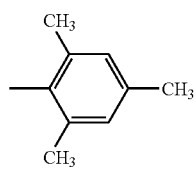 |
| c-5 | 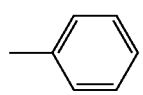 | H | H | 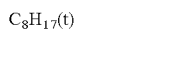 | C₈H₁₇(t) | |

-continued
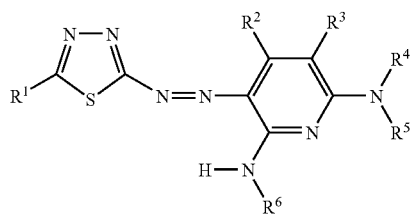
| Dye | R₁ | R₂ | R₃ | R₄ | R₅ | R₆ |
|---|---|---|---|---|---|---|
| d-1 | Me | CH₃ | CN | H | 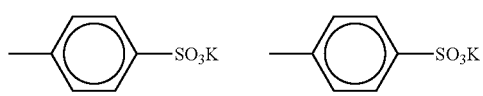 | |
| d-2 | Me | CH₃ | CN | H | 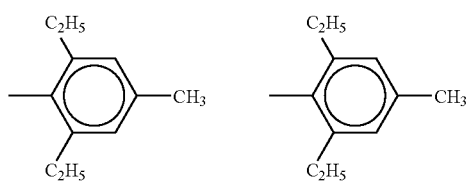 | |
| d-3 | Me | H | H | 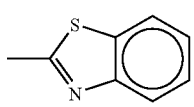 | 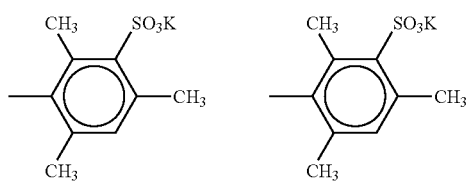 | |
| d-4 | Ph | CH₃ | CONH₂ | H | 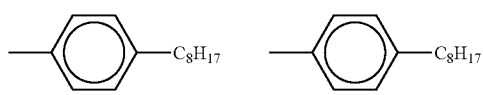 | |
| d-5 | Ph | CH₃ | H | 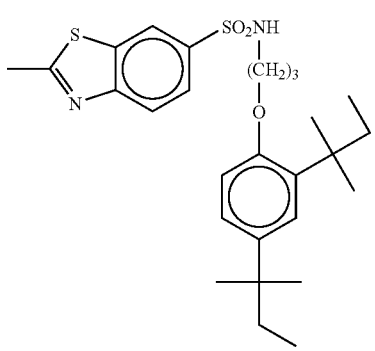 | 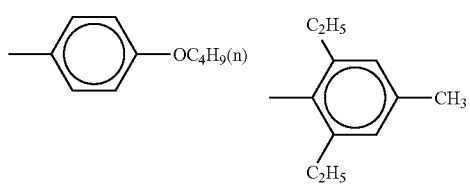 | |

-continued
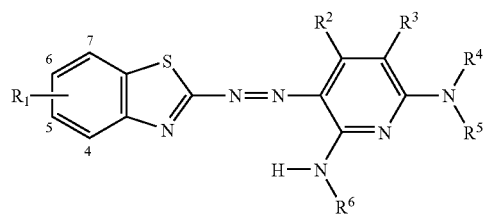
| Dye | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 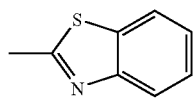 | 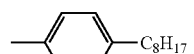 | 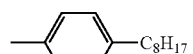 |
| e-3 | 5,6-diCl | CH₃ | H | 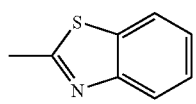 | 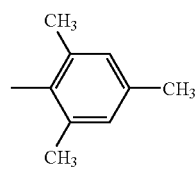 | COCH₃ |
| e-4 | 5-CH₃ | H | CN | H | 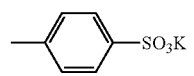 | 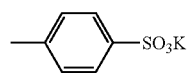 |
| e-5 | 5-NO₂ | CH₃ | H | SO₂CH₃ | 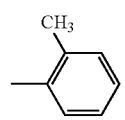 | 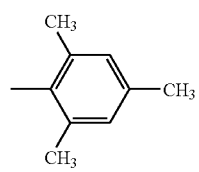 |
f-1
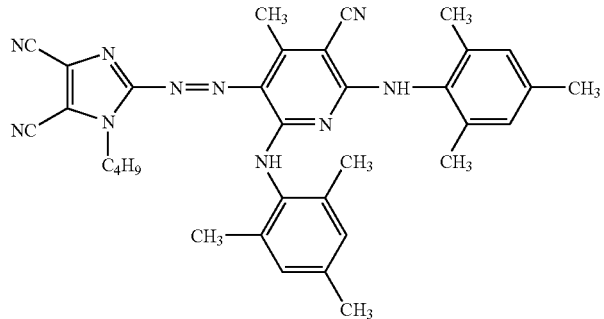

-continued f-2

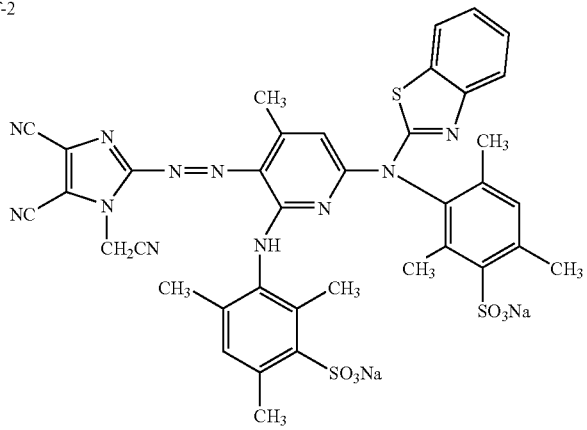

The magenta dye having the above-described azo group for use in the present invention has an oxidation potential, in an aqueous medium for ink, more positive than 1.0 V vs SCE, preferably more positive than 1.1 V vs SCE, more preferably more positive than 1.2 V vs SCE. The potential can be elevated by the selection from preferred constituent features described above, more specifically, by selecting a dye structure of a type having a chromophore represented by (heterocyclic ring A)-N=N-(heterocyclic ring B), selecting an azo dye where an aromatic nitrogen-containing 6-membered ring is bonded as a coupling component directly to at least one side of the azo group, or selecting an azo dye having an aromatic ring amino group or heterocyclic amino group-containing structure as an auxochrome, or furthermore by removing a hydrogen of the azo dye. In particular, the dye of formula (1) expresses a positive potential. This is specifically described in Japanese Patent Application No. 2001-254878.

The oxidation potential as used herein can be measured by various measuring methods such as direct polarography which is a method of measuring the oxidation potential in an aqueous solution or water-mixed solvent system having dissolved therein the dye based on SCE (standard saturated calomel electrode) as the reference electrode and in which a graphite or platinum electrode is used as the working electrode, polarography in which a dropping mercury electrode is used, cyclic voltammetry method (CV), rotating ring-disk electrode method and comb electrode method. The oxidation potential is specifically measured as follows. A test sample is dissolved to a concentration of $1\times10^{-4}$ to $1\times10^{-6}$ mol·dm$^{-3}$ in a solvent such as dimethylformamide or acetonitrile containing a supporting electrolyte such as sodium perchlorate or tetrapropylammonium perchlorate and the oxidation potential is measured as a value to SCE (standard saturated calomel electrode) by using the above-described method. The supporting electrolyte and solvent used can be appropriately selected according to the oxidation potential or solubility of the test sample. The supporting electrolyte and solvent which can be used are described in Akira Fujishima et al., *Denkikagaku Sokutei Ho (Electrochemical Measuring Method)*, pp. 101–118, Gihodo Shuppan Sha (1984).

The oxidation potential value sometimes deviates on the order of tens of millivolt due to the effect of, for example, liquid junction potential or liquid resistance of sample solution, but the reproducibility of measured potential value can be guaranteed by the calibration using a standard sample (for example, hydroquinone) and the same measured value can be obtained by any of those potential measuring methods.

Another basis for the oxidation resistance of the azo dye having an oxidation potential more positive than 1.0 V vs SCE is an enforced fading rate constant for ozone gas. The azo dye preferably has an enforced fading rate constant of $5.0\times10^{-2}$ [hour$^{-1}$] or less, more preferably $3.0\times10^{-2}$ [hour$^{-1}$] or less, still more preferably $1.5\times10^{-2}$ [hour$^{-1}$] or less.

The enforced fading rate constant for ozone gas is determined as follows. An image is printed on a reflective image-receiving medium by using only the above-described ink and the colored region having a color in the main spectral absorption region of the ink and having a reflection density of 0.90 to 1.10 as measured through a Status A filter is selected as the initial density point. This initial density is defined as the starting density (=100%). Then, this image is discolored by using an ozone fading tester capable of always keeping an ozone concentration of 5 mg/L, the time period until the density becomes 80% of the initial density is measured, a reciprocal [hour$^{-1}$] of this time period is determined and on the assumption that the relationship between the fading density and the time period follows the rate equation of first-order reaction, the value determined is used as the fading reaction rate constant. Accordingly, the fading rate constant obtained is a fading rate constant in the colored region of an image printed by the ink, but in the present invention, this vale is used as the fading rate constant of ink.

The test print patch may be a patch obtained by printing a black square symbol of JIS code 2223, a stepwise color patch of Macbeth chart, or an arbitrary stepwise density patch where the measured area can be obtained.

The reflection density of the reflection image (stepwise color patch) printed for measurement is a density determined with measurement light through a Status A filter by a densitometer satisfying the International Standard ISO5-4 (geometrical conditions for reflection density).

In the test chamber for the measurement of enforced fading rate constant for ozone gas, an ozone generator (for example, in a high-voltage discharge system of applying an a.c. voltage to dry air) capable of constantly maintaining an internal ozone gas concentration of 5 mg/L is provided and the exposure temperature is adjusted to 25° C.

This enforced fading rate constant is an index for showing the susceptibility to oxidation by oxidative atmosphere in the environment, such as photochemical smog, exhaust gas of automobiles, organic vapor from painted furniture surface or carpet, or gas generated from the frame interior in a bright room, and this is an index using ozone gas as a representative of such oxidative atmosphere.

The color hue of the magenta ink is described below. As the magenta ink, the dye preferably has λmax of 500 to 580 nm in view of color hue, and more preferably a small half-value width in the long-wave and short-wave sides of the maximum absorption wavelength, namely, sharp absorption. This is specifically described in JP-A-2002-309133. The sharp absorption can be also realized by introducing a methyl group into the α position of the azo dye.

The inkjet recording ink of the present invention preferably contains the azo dye in an amount of 0.2 to 20 weight %, more preferably from 0.5 to 15 weight %.

The inkjet recording ink of the present invention can be prepared by dissolving and/or dispersing the azo dye in an aqueous medium. The term "aqueous medium" as used in the present invention means water or a mixture of water and a small amount of water-miscible organic solvent, where additives such as wetting agent (preferably a surfactant as a dissolution or dispersion aid), stabilizer and antiseptic are added, if desired.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

The content of the water-miscible organic solvent for use in the present invention is usually from 1 to 80 weight %, preferably from 5 to 60 weight %, more preferably from 10 to 50 weight %, in the ink.

Out of those water-miscible organic solvents, if only an organic solvent having a high boiling point is used, this causes a problem that the formed image is readily blurred under high-humidity condition.

This problem can be solved by using, as the water-miscible organic solvent, at least one organic solvent having a boiling point of 150° C. or more and at least one organic solvent having a boiling point of less than 150° C.

Out of those solvents, examples of the low-boiling point solvent having a boiling point of less than 150° C. include methanol, ethanol, n-propanol, i-propanol, n-butanol, 2-butanol, tert-butanol, 2-methoxyethanol, 1-methoxy-2-propanol, 2-methoxy-1-propanol, acetone and acetonitrile. Among these, alcohol-base solvents are preferred.

The organic solvent having a boiling point of 150° C. or more can be selected from those described above, but this organic solvent is also preferably an alcohol-based solvent.

Also, two or more low-boiling solvents and two or more high-boiling point solvents may be selected and used. The percentage of the low-boiling point solvent in the entire organic solvent is preferably from 1 to 80 weight %, more preferably from 5 to 50 weight %.

It is also preferred to contain, as the water-miscible organic solvent, a mixture of two or more members where at least one member contains a polyhydric alcohol and/or a derivative thereof, at a concentration of 10 to 60 (weight/volume) %.

Examples of the polyhydric alcohol include those described above and examples of the polyhydric alcohol derivative include glycol derivatives. Examples of the glycol derivative include those described above.

In this case, the water-miscible organic solvent may be constituted by only two or more polyhydric alcohols, by only two or more polyhydric alcohol derivatives or by one or more polyhydric alcohol and one or more polyhydric alcohol derivative.

The proportion of the polyhydric alcohol and/or a derivative thereof contained in the water-miscible organic solvent is preferably from 15 to 55 weight %, more preferably from 20 to 50 weight %.

Out of those water-miscible organic solvents, if a solvent in which the dye has a high solubility is used in a large amount, this also causes a problem that the formed image is readily blurred under high-humidity condition.

This problem can be solved when an organic solvent in which the dye has a solubility of 10 (g/100 g-solvent) or more at 25° C. is contained as the water-miscible organic solvent to a content of 10 weight % or less in the ink.

The "solubility" as used herein indicates the weight of a solute dissolvable in 100 g of a solvent at a constant temperature and the unit thereof is "g/100 g-solvent".

As for the organic solvent in which the dye has a solubility of 10 (g/100 g-solvent) or more at 25° C., among those water-miscible organic solvents, alcohol-base solvents are particularly preferred.

The content of the solvent in which the dye has a solubility of 10 g/100 g-solvent or more at 25° C. is 10 weight % or less, preferably 5 weight % or less, in the ink.

Out of those water-miscible organic solvents, if an organic solvent having a heteroatom other than oxygen is used, this also causes a problem that the formed image is readily blurred under high-humidity condition.

Therefore, an organic solvent not containing a heteroatom other than an oxygen atom is preferably used as the water-miscible organic solvent.

Examples of the organic solvent having a heteroatom other than an oxygen atom include, out of those water-miscible organic solvents, thiodiglycol, amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile).

Accordingly, the organic solvent not containing a heteroatom other than an oxygen atom includes, out of those water-miscible organic solvents, the organic solvents excluding the above-described organic solvents having a heteroatom other than an oxygen atom.

The organic solvent as used herein indicates an organic solvent which is used as the main solvent for the preparation of ink, and does not include a pH adjusting agent used for adjusting the pH of ink, such as organic acids and amines, and a surfactant used for controlling the surface tension. Preferred examples of the organic solvent used here include alcohols, polyhydric alcohols (e.g., diol, triol) and glycol derivatives.

Out of those water-miscible organic solvents, if an organic solvent having a high vapor pressure is used, this causes a problem that the ejection stability is impaired due to drying of ink at the inkjet head.

Therefore, a water-miscible organic solvent having a vapor pressure of 2,000 Pa or less at 20° C. and exerting a drying inhibiting function or a penetration accelerating function is preferably contained.

The drying inhibiting function is a function of preventing clogging due to drying of ink at the ejection port and specific examples of the water-miscible organic solvent having such a function include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, preferred are polyhydric alcohols such as glycerin and diethylene glycol.

The penetration accelerating function is a function of more successfully penetrating the ink into paper and examples of the water-miscible organic solvent having such a function include lower monoalkyl ethers of polyhydric alcohol (for example, monomethyl ether, monoethyl ether, mono-n-butyl ether, mono-iso-butyl ether and mono-n-hexyl ether of ethylene glycol, diethylene glycol, triethylene glycol, propylene glycol or dipropylene glycol) and lower dialkyl ethers of polyhydric alcohol (for example, dimethyl ether and diethyl ether of ethylene glycol, diethylene glycol, triethylene glycol or propylene glycol).

The water-miscible organic solvent used here may have two or more of these functions and other functions such as viscosity adjusting function, in combination.

Incidentally, a water-miscible organic solvent having a vapor pressure exceeding 2,000 Pa at 20° C. can be used in an amount of 20 weight % or less in the ink. Examples of the water-miscible organic solvent other than the water-miscible organic solvent having a vapor pressure exceeding 2,000 Pa at 20° C., which can be used in combination, include ethanol.

In the case where the azo dye is an oil-soluble dye, the inkjet recording ink can be prepared by dissolving the oil-soluble dye in a high boiling point organic solvent and emulsion-dispersing it in an aqueous medium.

The high boiling point organic solvent for use in the present invention preferably has a boiling point of 150° C. or more, more preferably 170° C. or more.

Examples of the high boiling point organic solvent include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctane-decanoic acid) and alkylphosphoric acids (e.g., di-(2-ethylhexyl)phosphoric acid and diphenylphosphoric acid).

The high boiling point organic solvent can be used in an amount of, in terms of the weight ratio to the oil-soluble dye, from 0.01 to 3 times, preferably from 0.01 to 1.0 times.

These high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly(N-tert-butylacrylamide)].

Examples of the high boiling point organic solvent for use in the present invention, other than the above-described compounds, and the synthesis method of these high boiling point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225, 240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

In the present invention, the oil-soluble dye or high boiling point organic solvent is used by emulsion-dispersing it in an aqueous medium. Depending on the case, a low boiling point organic solvent may be used in combination at the emulsion-dispersion in view of emulsifiability. The low boiling point organic solvent which can be used in combination is an organic solvent having a boiling point of about 30 to 150° C. at atmospheric pressure. Preferred examples thereof include, but are not limited to, esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane).

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, however, a so-called phase inversion emulsification method of adding dropwise an aqueous phase in an oil phase can also be preferably used.

In performing the emulsion-dispersion of the present invention, various surfactants can be used. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

The surfactant used for emulsification is differing in the purpose from the surfactant added for adjusting the liquid properties of the inkjet recording ink, which is described later, but the same surfactant can be used and if the case is so, the function of adjusting the properties of ink can be exerted as a result.

For the purpose of stabilizing the dispersion immediately after emulsification, a water-soluble polymer may be added in combination with the surfactant. Preferred examples of the water-soluble polymer include polyvinyl alcohol, polyvinylpyrrolidone, polyethylene oxide, polyacrylic acid, polyacrylamide and copolymers thereof. Other than these, natural water-soluble polymers such as polysaccharides, casein and gelatin are also preferably used.

Furthermore, for the stabilization of dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains —$SO^{2-}$ or —$COO^-$.

In the case of using this polymer which does not substantially dissolve in an aqueous medium, the polymer is preferably used in an amount of 20 weight % or less, more preferably 10 weight % or less, based on the high boiling point organic solvent.

In preparing an aqueous ink by dispersing the oil-soluble dye or high boiling point organic solvent according to emulsion-dispersion, a matter of importance is the control of particle size. In order to elevate the color purity or density of an image formed by the inkjet recording, it is essential to reduce the average particle size. The average particle size is, in terms of the volume average particle size, preferably 1 μm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417–418.

For example, the ink is diluted with distilled water to have a particle concentration of 0.1 to 1 weight %, then, the particle size can be easily measured by a commercially available volume average particle size measuring apparatus (for example, Microtrac UPA (manufactured by Nikkiso K.K.)). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles with the volume of the particle and dividing the sum total of the obtained values by the total volume of the particles. The volume average particle size is described in Soichi Muroi, *Kobunshi Latex no Kagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about ejection failure or ejection slippage of ink and this seriously affects the printing performance. In order to prevent these troubles, it is important to reduce the number of particles having a particle size of 5 μm or more to 10 or less and the number of particles having a particle size of 1 μm or more to 1,000 or less, in 1 μl of ink prepared.

For removing these coarse particles, a known method such as centrifugal separation or microfiltration can be used. This separation step may be performed immediately after the emulsion-dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As for the emulsifying apparatus, known apparatuses such as simple stirrer, impeller stirring system, in-line stirring system, mill system (e.g., colloid mill) and ultrasonic system can be used, but a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A.P.V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus and after adding additives such as wetting agent and surfactant, again passing the dispersion through a high-pressure homogenizer during filling of the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent. Examples of the method include evaporation, vacuum evaporation and ultrafiltration. This removal of the low boiling point organic solvent is preferably performed as soon as possible immediately after the emulsification.

The inkjet recording ink of the present invention may contain a surfactant to control the liquid properties of the ink, whereby excellent effects can be provided, such as enhancement of ejection stability of ink, improvement of water resistance of image, and prevention of bleeding of printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is preferably from 0.001 to 15 weight %, more preferably from 0.005 to 10 weight %, still more preferably from 0.01 to 5 weight %, in the ink.

In the inkjet recording ink of the present invention, additives such as drying inhibitor for preventing clogging due to drying of ink at the ejection port, penetration accelerator for more successfully penetrating the ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent, may be appropriately selected and used in an appropriate amount.

The drying inhibitor for use in the present invention is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in an amount of 10 to 50 weight % in the ink.

Examples of the penetration accelerator which can be used in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 weight % of the penetration accelerator in the ink. The penetration accelerator is preferably used in an amount of causing no blurring of printed letter or no print through.

Examples of the ultraviolet absorbent which can be used in the present invention for improving the preservability of image include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291, compounds described in *Research Disclosure* No. 24239, and compounds of absorbing ultraviolet light and emitting fluorescent light, so-called fluorescent brightening agents, as represented by stilbene-base compounds and benzoxazole-base compounds.

As for the antioxidant which is used in the present invention for improving the preservability of image, various organic or metal complex-base fading inhibitors can be used. Examples of the organic fading inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. The fungicide is preferably used in an amount of 0.02 to 5.00 weight % in the ink.

The fungicide is described in detail, for example, in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. The rust inhibitor is preferably used in an amount of 0.02 to 5.00 weight % in the ink.

The pH adjusting agent for use in the present invention can be suitably used for adjusting the pH and imparting dispersion stability. The pH of the ink is preferably adjusted to 8 to 11 at 25° C. If the pH is less than 8, the solubility of dye decreases to readily cause clogging of a nozzle, whereas if it exceeds 11, the water resistance tends to deteriorate. Examples of the pH adjusting agent include organic bases and inorganic alkalis for giving a basic pH, and organic acids and inorganic acids for giving an acidic pH.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide, potassium hydroxide), alkali metal carbonates (e.g., sodium carbonate, sodium hydrogencarbonate) and ammonium. Examples of the organic acid include an acetic acid, a propionic acid, a trifluoroacetic acid and an alkylsulfonic acid. Examples of the inorganic acid include a hydrochloric acid, a sulfuric acid and a phosphoric acid.

In the present invention, apart from the above-described surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

The surface tension of the ink of the present invention is, with or without use of such a surface tension adjusting agent, preferably from 20 to 60 mN/m, more preferably from 25 to 45 mN/m.

The ink of the present invention preferably has a viscosity of 30 mPa·s or less. The viscosity is more preferably adjusted to 20 mPa·s or less. For the purpose of adjusting the viscosity, a viscosity adjusting agent is sometimes used. Examples of the viscosity adjusting agent include water-soluble polymers such as celluloses and polyvinyl alcohol, and nonionic surfactants. The viscosity adjusting agent is described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*) *-Zairyo no Kaihatsu Doko•Tenbo Chosa-* (*Chemicals for Inkjet Printer (Enlarged Edition of 98) -Survey on Development Tendency•Prospect of Materials-*), pp. 162–174, CMC (1997).

In the present invention, if desired, various cationic, anionic or nonionic surfactants described above may be used as a dispersant or a dispersion stabilizer, and fluorine- or silicone-base compounds or chelating agents as represented by EDTA may be used as a defoaming agent.

The recording paper and recording film for use in the image recording method of the present invention are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film sheet may be used. The thickness of the support is preferably from 10 to 250 μm and the basis weight is preferably from 10 to 250 g/m$^2$.

An image-receiving layer and a backcoat layer may be provided on the support as it is to produce an image-receiving material, or after providing a size press or an anchor coat layer by using starch, polyvinyl alcohol or the like, an image-receiving layer and a backcoat layer may be provided to produce an image-receiving material. The support may be further subjected to a flattening treatment by a calendering device such as machine calender, TG calender and soft calender.

In the present invention, the support is preferably paper or plastic film of which both surfaces are laminated with polyolefin (for example, polyethylene, polystyrene, polybutene or a copolymer thereof) or polyethylene terephthalate. In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production process (gas phase process) or a silicic acid hydrate obtained by a wet production process.

Specific examples of the recording paper containing the pigment in the image-receiving layer, which can be used, include those disclosed in JP-A-10-81064, JP-A-10-119423, JP-A-10-157277, JP-A-10-217601, JP-A-10-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and peeling resistance of the image-receiving layer.

The image-receiving layer may contain a mordant, a water-proofing agent, a light fastness enhancer, a gas resistance enhancer, a surfactant, a hardening agent and other additives in addition to the pigment and aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallyl-ammonium chloride and cation polyacrylamide. The content of the cationic resin is preferably from 1 to 15 weight %, more preferably from 3 to 10 weight %, based on the entire solid content of the ink-receiving layer.

Examples of the light fastness enhancer and the gas resistance enhancer include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids, benzotriazole compounds, benzophenone compounds, triazine compounds, heterocyclic compounds, water-soluble metal salts, organic metal compounds and metal complexes.

Specific examples of these compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surfactant functions as a coating aid, a releasability improver, a slipperiness improver or an antistatic agent. The surfactant is described in JP-A-62-173463 and JP-A-62-183457.

Instead of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin) The organic fluoro compound is described in JP-B-57-9053 (columns 8 to 17), JP-A-61-20994 and JP-A-62-135826.

As the hardening agent, for example, the materials described in JP-A-1-161236 (page 222), JP-A-9-263036, JP-A-10-119423 and JP-A-2001-310547 can be used.

Other examples of the additive added to the image-receiving layer include a pigment dispersant, a thickener, a defoaming agent, a dye, a fluorescent brightening agent, an antiseptic, a pH adjusting agent, a matting agent and a hardening agent. The image-receiving layer may be composed of one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing the dimension and preventing the curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The present invention is not limited in the inkjet recording system and is used for a known system, for example, an electric charge controlling system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the pressure generated.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink.

The inkjet recording ink of the present invention can also be used for uses other than the inkjet recording, such as a material for display image, an image-forming material for interior decoration, and an image-forming material for outdoor decoration.

The material for display image indicates various materials such as poster, wallpaper, ornamental goods (e.g., ornament, doll), handbill for commercial advertisement, wrapping paper, wrapping material, paper bag, vinyl bag, package material, image drawn on or attached to the side face of traffic (e.g., automobile, bus, electric car), and clothing with a logo.

In the case of using the dye of the present invention as a material for forming a display image, the image includes not only a strict image but also all patterns by a dye, which can be acknowledged by a human, such as abstract design, letter and geometrical pattern.

The material for interior decoration indicates various materials such as wallpaper, ornamental goods (e.g., ornament, doll), luminaire member, furniture member and design member of floor or ceiling. In the case of using the dye of the present invention as a material for forming an image, the image includes not only a strict image but also all patterns by a dye, which can be acknowledged by a human, such as abstract design, letter and geometrical pattern.

The material for outdoor decoration indicates various materials such as wall material, roofing material, billboard, gardening material, outdoor ornamental goods (e.g., ornament, doll) and outdoor luminaire member. In the case of using the dye of the present invention as a material for forming an image, the image includes not only a strict image but also all patterns by a dye, which can be acknowledged by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a dye in the form of a reactive dye having introduced thereinto a reactive group. Among these, preferred is dyeing by mordanting.

BEST MODE FOR CARRYING OUT THE INVENTION

The present invention is described below by referring to Examples, however, the present invention is not limited thereto.

EXAMPLE 1

Deionized water was added to the following components to make 1 liter and the resulting solution was stirred for 1 hour under heating at 30 to 40° C. and then filtered under reduced pressure through a microfilter having an average pore size of 0.25 μm to prepare a light magenta ink.

[Formulation of Light Magenta Ink LM-101]

| (Solid Contents) | |
| --- | --- |
| Magenta Dye (a-36) | 7.5 g/liter |
| Benzotriazole (BTZ) | 0.08 g/liter |
| PROXEL XL2 | 3.5 g/liter |
| (Liquid Components) | |
| Diethylene glycol (DEG) | 150 g/liter |
| Glycerin (GR) | 130 g/liter |
| Triethylene glycol monobutyl ether (TGB) | 130 g/liter |
| Triethanolamine (TEA) | 6.9 g/liter |
| Surfynol STG (SW) | 10 g/liter |

The oxidation potential of Magenta Dye (a-36) used here was more positive than 1.0 V (vs SCE).

Inks LM-102 to LM-106 were prepared by changing the solvent species of LM-101 as shown in the Table below.

| | LM-101 | LM-102 | LM-103 | LM-104 | LM-105 | LM-106 |
| --- | --- | --- | --- | --- | --- | --- |
| a-36 | 7.5 g | 7.5 g | 7.5 g | 7.5 g | 7.5 g | 7.5 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 150 g | — | 150 g | 50 g | 50 g | 50 g |
| GR | 130 g | 150 g | 100 g | 100 g | 100 g | 100 g |
| TGB | 130 g | 130 g | 150 g | 50 g | 50 g | 50 g |
| TEA | 6.9 g | 6.9 g | 6.9 g | 6.9 g | 6.9 g | 6.9 g |
| SW | 10 g | 10 g | 10 g | 10 g | 10 g | 10 g |
| PRD | — | 90 g | 10 g | 10 g | 10 g | 10 g |
| IPA | — | — | — | 150 g | — | — |
| MFG | — | — | — | — | 150 g | — |
| MS | — | — | — | — | — | 150 g |
| Finished amount* | 1 liter | 1 liter | 1 liter | 1 liter | 1 liter | 1 liter |

*All were made to a finished amount of 1 liter by adding water.

PRD: 2-Pyrrolidone
IPA: 2-Propanol
MFG: 1-Methoxy-2-propanol
MS: 2-Methoxyethanol Also, Magenta Ink Solution M-101 was prepared by increasing Magenta Dye (a-36) to 23 g in the formulation above.

[Formulation of Magenta Ink M-101]

| (Solid Contents) | |
| --- | --- |
| Magenta Dye (a-36) | 23 g/liter |
| Benzotriazole (BTZ) | 0.08 g/liter |
| PROXEL XL2 | 3.5 g/liter |
| (Liquid Components) | |
| Diethylene glycol (DEG) | 150 g/liter |
| Glycerin (GR) | 130 g/liter |
| Triethylene glycol monobutyl ether (TGB) | 130 g/liter |
| Triethanolamine (TEA) | 6.9 g/liter |
| Surfynol STG (SW) | 10 g/liter |

Magenta Inks M-102 to M-106 were prepared by changing the ink formulation of M-101 as shown in the Table below.

| | M-101 | M-102 | M-103 | M-104 | M-105 | M-106 |
| --- | --- | --- | --- | --- | --- | --- |
| a-36 | 23 g | 23 g | 23 g | 23 g | 23 g | 23 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 150 g | — | 150 g | 50 g | 50 g | 50 g |
| GR | 130 g | 150 g | 100 g | 70 g | 70 g | 70 g |
| TGB | 130 g | 100 g | 150 g | 20 g | 20 g | 20 g |
| TEA | 6.9 g | 6.9 g | 6.9 g | 6.9 g | 6.9 g | 6.9 g |
| SW | 10 g | 10 g | 10 g | 10 g | 10 g | 10 g |
| PRD | — | 100 g | 10 g | 10 g | 10 g | 10 g |
| IPA | — | — | — | 180 g | — | — |
| MFG | — | — | — | — | 180 g | — |
| MS | — | — | — | — | — | 180 g |
| Finished amount* | 1 liter | 1 liter | 1 liter | 1 liter | 1 liter | 1 liter |

*All were made to a finished amount of 1 liter by adding water.

These inks each was filled in a magenta ink-light magenta ink cartridge of Inkjet Printer PM-950C manufactured by Seiko Epson Corporation and by using the inks of PM-950C for other colors, a magenta monochromatic image was printed. The image was printed on inkjet paper Photo Gloss Paper EX produced by Fuji Photo Film Co., Ltd. used as the image-receiving sheet and evaluated on the ejection stability of ink, image fastness and blurring of image under high-humidity condition.

(Evaluation Test)

1) As for the ejection stability, cartridges were set in the printer and after confirming the ejection of ink from all nozzles, the image was output on 20 sheets of A4-size paper and rated based on the following criteria:

A: Printing was not disordered from the start to the end of printing.

B: Printing was disordered in some outputs.

C: Printing was disordered from the start to the end of printing.

2) As for the image preservability, a magenta solid image printed sample was prepared and subjected to the following evaluations.

(1) In the evaluation of light fastness, the image density Ci immediately after printing was measured by a reflection densitometer (X-Rite 310TR) and after the image was irradiated with xenon light (85,000 lx) for 10 days by using a weather meter manufactured by Atlas, the image density Cf was again measured. Then, the dye residual ratio (100× Cf/Ci) was determined and evaluated. The dye residual ratio was evaluated at three points having a reflection density of 1, 1.5 and 2. The sample was rated A when the dye residual ratio was 70% or more at any density, rated B when less than 70% at two points, and rated C when less than 70% at all points.

(2) In the evaluation of heat fastness, the density was measured by a reflection densitometer (X-Rite 310TR) before and after the sample was stored for 10 days under the conditions of 80° C. and 15% RH and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

(3) In the evaluation of ozone fastness, the photo gloss paper having formed thereon an image was left standing for 7 days in a box set to an ozone gas concentration of 0.5 ppm and the image density before and after standing in the ozone gas atmosphere was measured by a reflection densitometer (X-Rite 310TR) and evaluated as the dye residual ratio. The dye residual ratio was measured at three points having a reflection density of 1, 1.5 and 2.0. The ozone gas concentration in the box was set by using an ozone gas monitor (Model OZG-EM-01) manufactured by APPLICS.

The sample was rated on a scale of three stages, namely, rated A when the dye residual ratio was 80% or more at any density, rated B when less than 80% at one or two point(s), and rated C when less than 70% at all points.

3) As for the blurring of the image under high-humidity condition, a printing pattern where four magenta square patterns each in a size of 3 cm×3 cm were arrayed to form a two-line and two-column table shape with a 1-mm white clearance between respective square patterns was prepared and after this image sample was stored under conditions of 25° C. and 90% RH for 72 hours, the bleeding of magenta dye in the white clearance was observed. The sample was rated A when the increase of magenta density in the white clearance based on the density immediately after printing was less than 0.01 as measured by a magenta filter of Status A, rated B when from 0.01 to 0.05, and rated C when more than 0.05.

The results obtained are shown in the Table below.

| | Ejection Stability | Light Fastness | Heat Fastness | $O_3$ Resistance | M Bleeding |
|---|---|---|---|---|---|
| Genuine ink of EPSON (PM-950) | A | C | B | C | B |
| LM-101, M-101 (Reference Example) | A | A | A | A | C |
| LM-102, M-102 (Reference Example) | A | A | A | A | C |
| LM-103, M-103 (Reference Example) | A | A | A | A | C |
| LM-104, M-104 (Invention) | A | A | A | A | A |
| LM-105, M-105 (Invention) | A | A | A | A | A |
| LM-106, M-106 (Invention) | A | A | A | A | A |

As seen from the results in the Table, the systems using the ink set of the present invention were decreased in the bleeding as compared with Reference Examples and also surpassed the genuine ink of EPSON in view of both the fastness of image and the blurring of image.

EXAMPLE 2

Deionized water was added to the following components to make 1 liter and the resulting solution was stirred for 1 hour under heating at 30 to 40° C. and after adjusting the pH to 9 with 10 mol/liter of KOH, filtered under reduced pressure through a microfilter having an average pore size of 0.25 μm to prepare light magenta ink solution.

[Formulation of Light Magenta Ink LM-101]

| (Solid Contents) | |
|---|---|
| Magenta Dye (a-36) | 9.5 g/liter |
| Diethylene glycol (DEG) | 47 g/liter |
| Urea | 37 g/liter |
| Glycerin (GR) | 198 g/liter |
| Triethylene glycol monobutyl ether (TGB) | 105 g/liter |
| 2-Pyrrolidone | 40 g/liter |
| Triethanolamine (TEA) | 7 g/liter |
| Benzotriazole (BTZ) | 0.07 g/liter |
| PROXEL XL2 | 5.0 g/liter |
| Surfactant (w-1) | 6.0 g/liter | w-1

$(n)C_5H_{11}$
$(n)C_5H_{11}$
$CHO{-}(CH_2CH_2O)_{10}H$

Furthermore, a magenta ink, a light cyan ink, a cyan ink, a yellow ink and a black ink were prepared by changing the dye species and the additives, and Ink Set 101 shown in the Table below was prepared. The unit "(weight/vol) %" of the water-miscible organic solvent concentration is hereinafter simply denoted as "%".

|  | Light Cyan | Cyan | Light Magenta | Magenta | Yellow | Dark Yellow | Black |
| --- | --- | --- | --- | --- | --- | --- | --- |
| Dye (g/liter) | A-2 | A-2 | a-36 | a-36 | A-3 | A-3 | B-5 |
|  | 17.5 | 68.0 | 9.5 | 30.2 | 14.0 | 10.0 | 20.0 |
|  |  |  |  |  | A-4 | A-4 | A-6 |
|  |  |  |  |  | 14.0 | 10.0 | 39.0 |
|  |  |  |  |  | A-2 | A-2 | A-7 |
|  |  |  |  |  |  | 13.0 | 17.0 |
|  |  |  |  |  |  | A-3 |  |
|  |  |  |  |  |  | 30.0 |  |
| Diethylene glycol (g/liter) | 167 | 110 | 47 | 76 | 85 | — | 20 |
| Urea (g/liter) | — | — | 37 | 46 | — | — | — |
| Glycerin (g/liter) | 164 | 148 | 198 | 150 | 154 | 147 | 120 |
| Triethylene glycol monobutyl ether (g/liter) | 125 | 132 | 105 | 107 | 130 | 127 | — |
| Diethylene glycol monobutyl ether (g/liter) | — | — | — | — | — | — | 230 |
| 2-Pyrrolidone (g/liter) | — | 20 | 40 | — | — | — | 80 |
| Surfactant (w-1) (g/liter) | 10 | 10 | 6 | 12 | 3 | 3 | 5 |
| Triethanolamine (g/liter) | 6.5 | 10 | 7 | 7 | 1 | 1 | 18 |
| Benzotriazole (g/liter) | 0.07 | 0.09 | 0.07 | 0.08 | 0.06 | 0.08 | 0.08 |
| Proxel XL2 (g/liter) | 1.0 | 4.0 | 5.0 | 4.5 | 3 | 5 | 4 |
| Concentration of water-miscible organic solvent (%) | 46.25 | 42.0 | 39.7 | 34.0 | 37.0 | 27.5 | 46.8 |

Deionized water was added to make 1 liter.

A-1

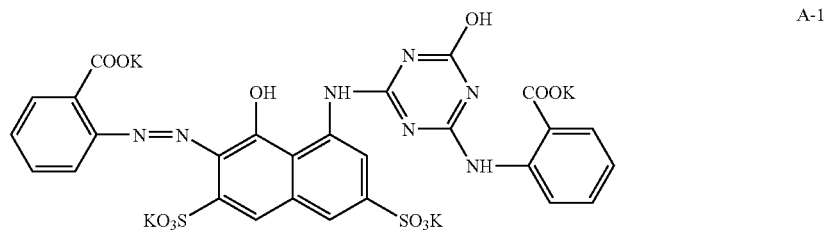

A-2

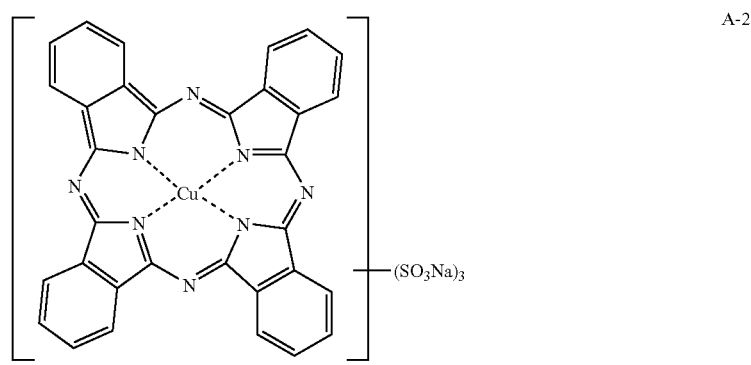

A-3

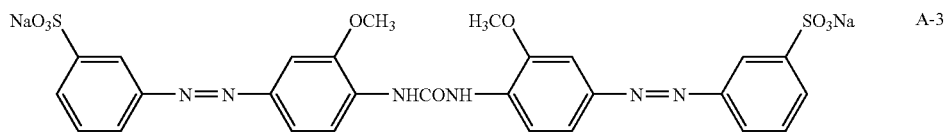

A-4

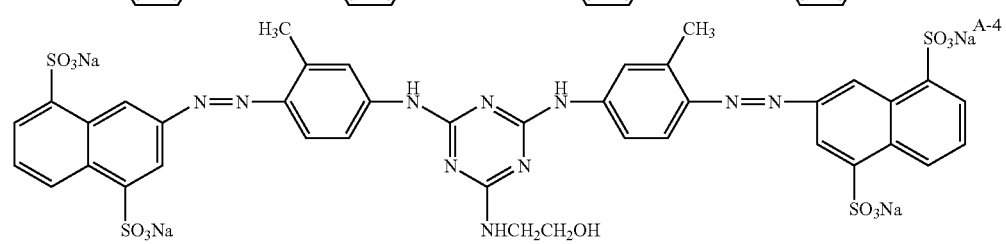

-continued

| | Light Cyan | Cyan | Light Magenta | Magenta | Yellow | Dark Yellow | Black |
|---|---|---|---|---|---|---|---|

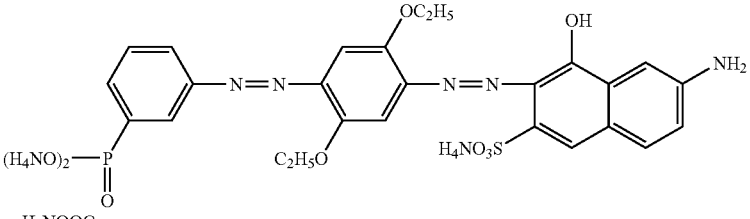

A-5

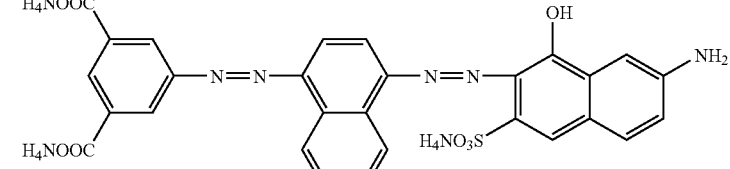

A-6

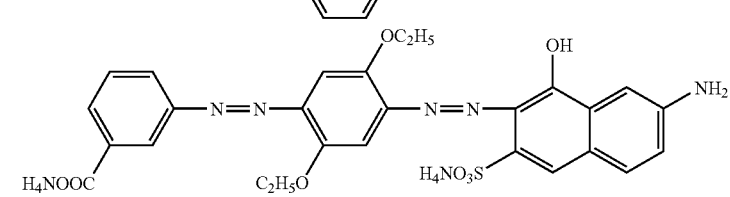

A-7

Ink Sets 102 to 110 were prepared by changing the dye species for light magenta ink and magenta ink and the concentration of water-miscible organic solvent in Ink Set 101 as shown in the Table below. The concentration of the water-miscible organic solvent was set by appropriately adjusting the amounts added of diethylene glycol, glycerin, triethylene glycol monobutyl ether, diethylene glycol monobutyl ether, 2-pyrrolidone and triethanolamine.

| Ink Set | | Presence or Absence of Polyhydric Alcohol and/or Derivative Thereof | Light Magenta (%) | Magenta (%) | Remarks |
|---|---|---|---|---|---|
| 101 | dye<br>concentration of water-miscible organic solvent | present | a-36<br>39.7 | a-36<br>34.0 | Invention |
| 102 | dye<br>concentration of water-miscible organic solvent | present | a-36<br>20.0 | a-36<br>34.0 | Invention |
| 103 | dye<br>concentration of water-miscible organic solvent | present | a-36<br>39.7 | a-36<br>20.0 | Invention |
| 104 | dye<br>concentration of water-miscible organic solvent | present | a-38<br>45.0 | a-36<br>45.0 | Invention |
| 105 | dye<br>concentration of water-miscible organic solvent | present | a-38<br>20.0 | a-38<br>20.0 | Invention |
| 106 | dye<br>concentration of water-miscible organic solvent | present | a-36<br>5.0 | a-36<br>34.0 | Reference |
| 107 | dye<br>concentration of water-miscible organic solvent | present | a-36<br>5.0 | a-36<br>5.0 | Reference |
| 108 | dye<br>concentration of water-miscible organic solvent | present | a-36<br>70.0 | a-36<br>70.0 | Reference |
| 109 | dye<br>concentration of water-miscible organic solvent | none | a-36<br>35.7 | a-36<br>34.0 | Reference |
| 110 | dye<br>concentration of water-miscible organic solvent | present | A-1<br>35.7 | A-1<br>34.0 | Comparison |

These ink sets 101 to 110 each was filled in cartridges of Inkjet Printer PM920C (manufactured by Seiko Epson Corporation) and an image was printed by this printer on inkjet paper Photo Gloss Paper EX produced by Fuji Photo Film Co., Ltd. and subjected to the following evaluations.

The ejection stability (1) was evaluated in the same manner as in Example 1.

As for the ejection stability (2), the cartridge was left standing at 60° C. for 2 days and thereafter, the disorder of printing was evaluated in the same manner as in the ejection stability (1).

As for the drying property, the image was touched with a finger immediately after printing and the staining was evaluated with an eye.

○: No problematic level. Δ: Slightly bad level. X: Problematic level.

As for the fineline blurring (1), yellow, magenta, cyan and black fineline patterns were printed and evaluated with an eye.

○: No problematic level. Δ: Slightly bad level. X: Problematic level.

As for the fineline blurring (2), in the case of black, the magenta ink was solid-printed, then finelines of black were printed, and the blurring due to contact of two colors was evaluated.

○: No problematic level. Δ: Slightly bad level. X: Problematic level.

As for the water resistance, the obtained image was immersed in deionized water for 10 seconds and then the blurring of image was evaluated.

○: No problematic level. Δ: Slightly bad level. X: Problematic level.

As for the image preservability, a magenta solid image printed sample was prepared and subjected to the following evaluations.

In the evaluation of light fastness, the image density Ci immediately after printing was measured by a reflection densitometer (X-Rite 310TR) and after the image was irradiated with xenon light (85,000 lx) for 7 days by using a weather meter manufactured by Atlas, the image density Cf was again measured. Then, the dye residual ratio (100× Cf/Ci) was determined and evaluated. The dye residual ratio was evaluated at three points having a reflection density of 1, 1.5 and 2. The sample was rated A when the dye residual ratio was 85% or more at any density, rated B when less than 85% at two points, and rated C when less than 85% at all points.

In the evaluation of heat fastness, the density was measured by a reflection densitometer (X-Rite 310TR) before and after the sample was stored for 7 days under the conditions of 80° C. and 70% RH and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

In the evaluation of ozone resistance, the density was measured by a reflection densitometer (X-Rite 310TR) before and after the sample was stored for 7 days under the conditions of ventilation and heating at 80° C. and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

The results obtained are shown in the Table below.

| Ink Set | Ejection Stability (1) | Ejection Stability (2) | Drying Property | Fineline Blurring (1) | Fineline Blurring (2) | Water Resistance |
|---|---|---|---|---|---|---|
| 101 | A | A | ○ | ○ | ○ | ○ |
| 102 | A | A | ○ | ○ | ○ | ○ |
| 103 | A | A | ○ | ○ | ○ | ○ |
| 104 | A | A | ○ | ○ | ○ | ○ |
| 105 | A | A | ○ | ○ | ○ | ○ |
| 106 | B | C | ○ | ○ | ○ | ○ |
| 107 | B | C | ○ | ○ | ○ | ○ |
| 108 | B | B | X | ○ | ○ | X |
| 109 | C | C | ○ | ○ | ○ | ○ |
| 110 | A | B | ○ | ○ | ○ | ○ |

| Ink Set | Light Fastness | Heat Fastness | Ozone Resistance | Remarks |
|---|---|---|---|---|
| 101 | A | A | A | Invention |
| 102 | A | A | A | Invention |
| 103 | A | A | A | Invention |
| 104 | A | A | A | Invention |
| 105 | A | A | A | Invention |
| 106 | A | A | A | Reference |
| 107 | A | A | A | Reference |
| 108 | A | B | B | Reference |
| 109 | A | A | A | Reference |
| 110 | B | B | C | Comparison |

It is seen that when the ink of the present invention is used, excellent ejection stability can be obtained and also that excellent performance is exhibited regarding water resistance and fastness. Furthermore, the ink of the present invention is excellent in the performance at the fineline output and free from fineline blurring.

The color hue obtained by the inks (101 to 105) of the present invention was equal to that of Ink (109).

Also, when inks of the present invention were prepared by using other water-soluble dyes represented by formula (1) in place of the magenta dye (a-36) in Example 2, the same effects as in Example 2 were obtained on the weather resistance, ejection stability and color hue.

Incidentally, even when the image-receiving paper used in the present invention was changed to PM Photographic Paper produced by Seiko Epson Corporation or PR101 produced by Canon Inc., the same effects as in the results above were obtained.

EXAMPLE 3

The same inks as prepared in Example 2 were filled in cartridges of Inkjet Printer BJ-F850 (manufactured by Canon Inc.) and an image was printed by this printer on inkjet paper Photo Gloss Paper EX produced by Fuji Photo Film Co., Ltd. and evaluated in the same manner as in Example 2. Then, the same results as in Example 2 were obtained. Even when the image-receiving paper was changed to PM Photographic Paper produced by Seiko Epson Corporation or PR101 produced by Canon Inc., the same effects were obtained.

EXAMPLE 4

Dye (a-3) (6 g) and 4 g of dioctylsulfosuccinic acid were dissolved in 4.0 g of High Boiling Point Organic Solvent (s-1), 6.0 g of High Boiling Point Organic Solvent (s-2) and 50 ml of ethyl acetate at 70° C. To the resulting solution, 500 ml of deionized water was added while stirring with magnetic stirrer to produce an oil-in-water type coarse particle dispersion.

This coarse particle dispersion was passed 5 times through Microfluidizer (manufactured by Microfluidex Inc.) under a pressure of 60 MPa, thereby performing the pulverization. From the finished emulsified product, the solvent was removed by a rotary evaporator until the odor of ethyl acetate was not generated.

To the thus-obtained finely emulsified product of oil-soluble dye, 130 g of diethylene glycol, 64.0 g of glycerin, 10 g of triethanolamine, 13 g of Surfactant (w-1) and additives such as urea were added. Thereafter, deionized water was added and the pH was adjusted to 9 with 10 mol/liter of KOH to produce a light magenta ink shown in the Table below. The volume average particle size of the resulting emulsion-dispersed ink was measured by using Microtrac UPA (manufactured by Nikkiso K.K.) and found to be 60 nm.

Also, the magenta ink, cyan ink, light cyan ink, yellow ink and black ink of Ink Set 201 shown in the Table below were prepared by changing the dye species and high boiling point organic solvents used.

|  | Light Cyan | Cyan | Light Magenta | Magenta | Yellow | Dark Yellow | Black |
|---|---|---|---|---|---|---|---|
| Dye (g/liter) | C-1 | C-1 | a-3 | a-3 | Y-1 | Y-1 | C-1 |
|  | 7.0 | 35.0 | 6.0 | 20.0 | 28.0 | 10.0 | 19.0 |
|  |  |  |  |  |  | C-1 | M-1 |
|  |  |  |  |  |  | 10.0 | 10.0 |
|  |  |  |  |  |  |  | Y-1 |
|  |  |  |  |  |  |  | 14.0 |
| High Boiling Point Organic Solvent (g/liter) | S-1 6.0 S-2 10.0 | 25.0 45.0 | 4.0 6.0 | 14.0 25.0 | 20.0 35.0 | 20.0 35.0 | 30.0 53.0 |
| Sodium dioctyl-sulfosuccinate (g/liter) | 4.0 | 30.0 | 6.2 | 23.0 | 35.0 | 35.0 | 52.0 |
| Diethylene glycol (g/liter) | 140 | 140 | 130 | 140 | 130 | 130 | 120 |
| Urea (g/liter) | 46.0 | 46.0 | 46.0 | 46.0 | 46.0 | 46.0 | 46.0 |
| Glycerin (g/liter) | 64.0 | 64.0 | 64.0 | 64.0 | 64.0 | 64.0 | 64.0 |
| Triethanolamine (g/liter) | 10 | 10 | 10 | 10 | 10 | 10 | 10 |
| Benzotriazole (g/liter) | 0.08 | 0.08 | 0.08 | 0.08 | 0.08 | 0.08 | 0.08 |
| Surfactant (w-1) (g/liter) | 13 | 13 | 13 | 13 | 13 | 13 | 13 |
| Proxel XL2 (g/liter) | 3.5 | 3.5 | 3.5 | 3.5 | 3.5 | 3.5 | 3.5 |
| Concentration of water-miscible organic solvent (%) | 21.4 | 21.4 | 20.4 | 21.4 | 20.4 | 20.4 | 19.4 |
| Deionized water was added to make 1 liter. | | | | | | | |
| Volume average particle size | 58 nm | 65 nm | 60 nm | 55 nm | 60 nm | 58 nm | 70 nm |

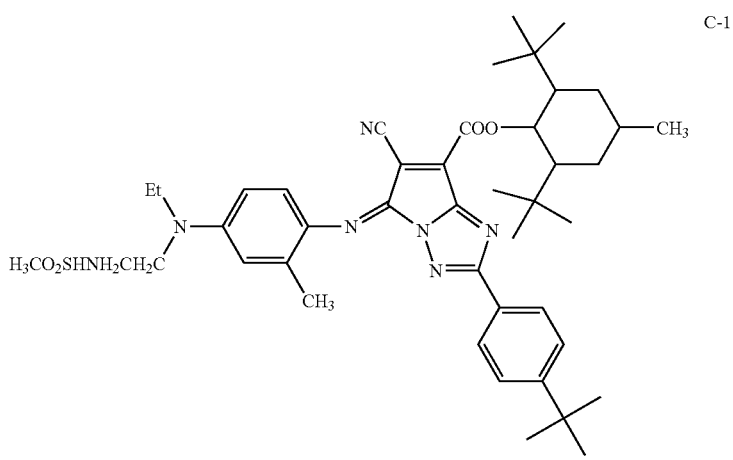

C-1

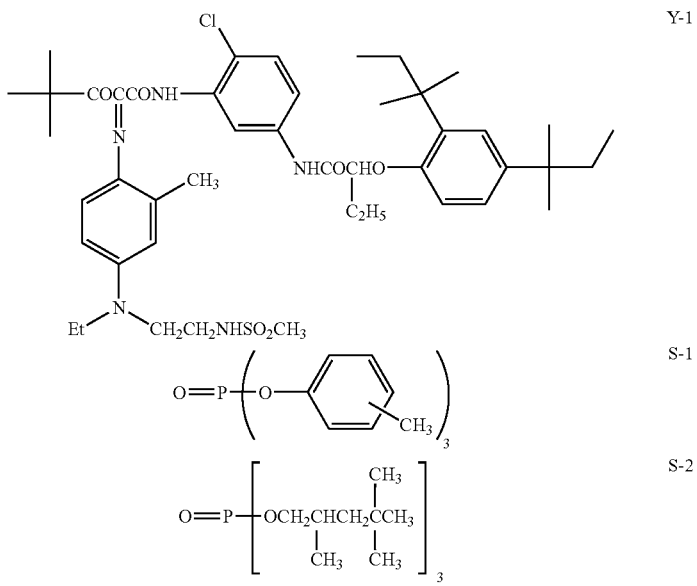

Y-1

S-1

S-2

Also, Ink Sets 202 to 210 were prepared in the same manner by changing the magenta ink and light magenta ink as shown in the Table below.

In all ink sets, the amount of dye added in the magenta ink and light magenta ink was 0.6 weight % and 2.0 weight %, respectively.

Furthermore, Ink Set 210 for comparison was prepared according to the same formulation as Ink Set 210 except for changing the dye species to M-1. These Ink Sets 201 to 209 each was filled in cartridges of Inkjet Printer PM920 (manufactured by Seiko Epson Corporation) and an image was printed by this printer on inkjet paper Photo Gloss Paper EX produced by Fuji Photo Film Co., Ltd. and subjected to the same evaluations as in Example 2. The results obtained are shown in the Table below.

M-1:

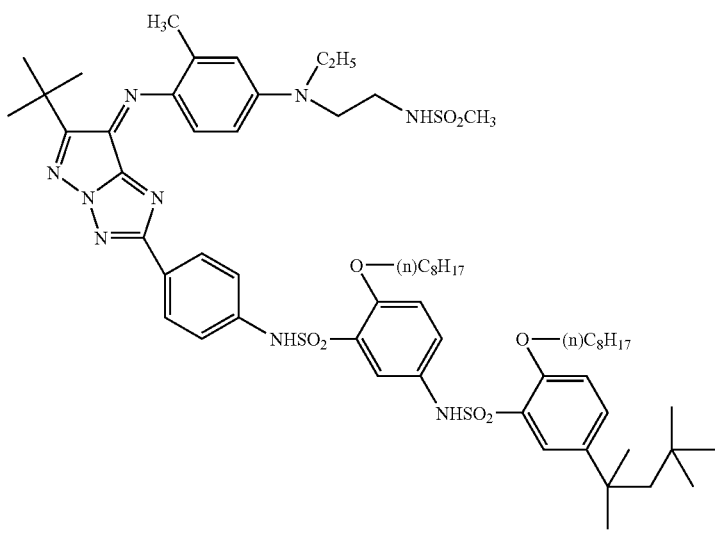

| Ink Set | Dye | Concentration of Water-Miscible Organic Solvent (%) | Ejection Stability (1) | Polyhydric Alcohol and/or Derivative Thereof | Light Fastness | Heat Fastness | Ozone Resistance | Water Resistance | Fineline Blurring (1) | Fineline Blurring (2) | Remarks |
|---|---|---|---|---|---|---|---|---|---|---|---|
| 201 | a-36 | 20 | A | present | A | A | A | A | ○ | ○ | Invention |
| 202 | a-36 | 30 | A | present | A | A | A | A | ○ | ○ | Invention |

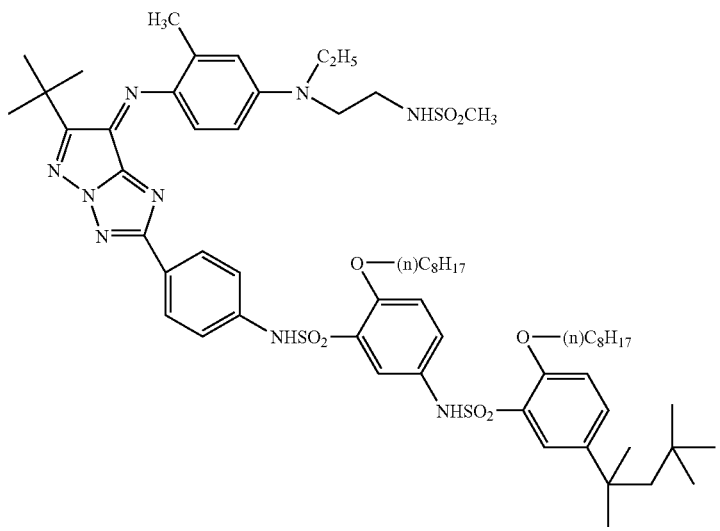

| Ink Set | Dye | Concentration of Water-Miscible Organic Solvent (%) | Ejection Stability (1) | Polyhydric Alcohol and/or Derivative Thereof | Light Fastness | Heat Fastness | Ozone Resistance | Water Resistance | Fineline Blurring (1) | Fineline Blurring (2) | Remarks |
|---|---|---|---|---|---|---|---|---|---|---|---|
| 203 | a-36 | 40 | A | present | A | A | A | A | ○ | ○ | Invention |
| 204 | a-33 | 30 | A | present | A | A | A | A | ○ | ○ | Invention |
| 205 | a-33 | 40 | A | present | A | A | A | A | ○ | ○ | Invention |
| 206 | a-33 | 50 | A | present | A | A | A | A | ○ | ○ | Invention |
| 207 | a-33 | 5 | B | present | A | A | A | A | ○ | ○ | Reference |
| 208 | a-33 | 70 | C | present | A | A | A | A | ○ | ○ | Reference |
| 209 | a-36 | 30 | A | none | A | A | A | A | ○ | ○ | Reference |
| 210 | M-1 | 30 | A | present | A | A | B | A | ○ | ○ | Comparison |

It is seen that the ink of the present invention is excellent in all of ejection stability, weather resistance (light fastness, heat fastness and ozone resistance) and water resistance and can give a recorded image free from fineline blurring.

The color hue obtained by the inks (201 to 205) of the present invention was equal to that of ink (210).

Also, when inks of the present invention were prepared by using other oil-soluble dyes represented by formula (1) in place of the magenta used in Example 4, the same effects as in Example 4 were obtained on the weather resistance, ejection stability and color hue.

EXAMPLE 5

A light magenta ink was prepared in the same manner as in Example 1 except for using the following components.

[Formulation of Light Magenta Ink LM-101]

(Solid Contents)

| Magenta Dye (a-36) | 7.5 g/liter |
|---|---|
| Benzotriazole (BTZ) | 0.08 g/liter |
| PROXEL XL2 | 3.5 g/liter |

(Liquid Components)

| Diethylene glycol (DEG) | 150 g/liter |
|---|---|
| Glycerin (GR) | 130 g/liter |
| Triethylene glycol monobutyl ether (TGB) | 130 g/liter |

-continued

| Triethanolamine (TEA) | 6.9 g/liter |
|---|---|
| Surfynol STG (SW) | 10 g/liter |

Inks LM-102 to LM-106 were prepared by changing the solvent species of LM-101 as shown in the Table below.

| | LM-101 | LM-102 | LM-103 | LM-104 | LM-105 | LM-106 |
|---|---|---|---|---|---|---|
| a-36 | 7.5 g | 7.5 g | 7.5 g | 7.5 g | 7.5 g | 7.5 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 150 g | 150 g | 150 g | 150 g | 150 g | 100 g |
| GR | 130 g | 130 g | 130 g | 130 g | 130 g | 120 g |
| TGB | 130 g | — | 80 g | — | 40 g | 20 g |
| DGB | — | — | — | 150 g | 100 g | — |
| DGE | — | 150 g | 80 g | 6.9 g | 6.9 g | 6.9 g |
| MFG | — | — | — | — | 100 g | 250 g |
| TEA | 6.9 g | 6.9 g | 6.9 g | 6.9 g | 6.9 g | 6.9 g |
| SW | 10 g | 10 g | 10 g | 10 g | 10 g | 10 g |
| Finished amount* | 1 liter | 1 liter | 1 liter | 1 liter | 1 liter | 1 liter |
| D** | 13.7 | 15.7 | 16.7 | 0.7 | 4.7 | 2.7 |

*All were made to a finished amount of 1 liter by adding water.
**The concentration (weight %) of solvent in which Dye (a-36) has a solubility of 10 g/100 g-solvent or more at 25° C.
DGB: Diethylene glycol monobutyl ether
DGE: Diethylene glycol monoethyl ether
MFG: 1-Methoxy-2-propanol Solvent in which Dye (a-36) has a solubility of 10 g/100 g-solvent or more at 25° C.:

Three solvents, that is, TGB, DGE and TEA.

Also, Magenta Ink Solution M-101 was prepared by increasing Magenta Dye (a-36) to 23 g in the formulation above.

[Formulation of Magenta Ink M-101]

| (Solid Contents) | |
|---|---|
| Magenta Dye (a-36) | 23 g/liter |
| Benzotriazole (BTZ) | 0.08 g/liter |
| PROXEL XL2 | 3.5 g/liter |
| (Liquid Components) | |
| Diethylene glycol (DEG) | 150 g/liter |
| Glycerin (GR) | 130 g/liter |
| Triethylene glycol monobutyl ether (TGB) | 130 g/liter |
| Triethanolamine (TEA) | 6.9 g/liter |
| Surfynol STG (SW) | 10 g/liter |

Magenta Inks M-102 to M-106 were prepared by changing the ink formulation of M-101 as shown in the Table below.

| | M-101 | M-102 | M-103 | M-104 | M-105 | M-106 |
|---|---|---|---|---|---|---|
| a-36 | 23 g | 23 g | 23 g | 23 g | 23 g | 23 g |
| BTZ | 0.08 g | 0.08 g | 0.08 g | 0.08 g | 0.08 g | 0.08 g |
| DEG | 150 g | 150 g | 150 g | 150 g | 150 g | 100 g |
| GR | 130 g | 130 g | 130 g | 130 g | 130 g | 120 g |
| TGB | 130 g | — | 80 g | — | 40 g | 20 g |
| DGB | — | — | — | 150 g | 100 g | — |
| DGE | — | 150 g | 80 g | 6.9 g | 6.9 g | 6.9 g |
| MFG | — | — | — | — | 100 g | 250 g |
| TEA | 6.9 g | 6.9 g | 6.9 g | 6.9 g | 6.9 g | 6.9 g |
| SW | 10 g | 10 g | 10 g | 10 g | 10 g | 10 g |
| Finished amount* | 1 liter | 1 liter | 1 liter | 1 liter | 1 liter | 1 liter |
| D** | 13.7 | 15.7 | 16.7 | 0.7 | 4.7 | 2.7 |

These inks were evaluated on the ejection stability of ink, the image fastness and the blurring of image under high-humidity condition in the same manner as in Example 1. The results obtained are shown in the Table below.

| | Ejection Stability | Light Fastness | Heat Fastness | O₃ Resistance | M Bleeding |
|---|---|---|---|---|---|
| Genuine ink of EPSON (PM-950) | A | C | B | C | B |
| LM-101, M-101 (Reference Example) | A | A | A | A | C |
| LM-102, M-102 (Reference Example) | A | A | A | A | C |
| LM-103, M-103 (Reference Example) | A | A | A | A | C |
| LM-104, M-104 (Invention) | A | A | A | A | A |
| LM-105, M-105 (Invention) | A | A | A | A | A |
| LM-106, M-106 (Invention) | A | A | A | A | A |

As seen from the results in the Table, the systems using the ink set of the present invention were decreased in the bleeding as compared with Reference Examples and also surpassed the genuine ink of EPSON in view of both the fastness of image and the blurring of image.

EXAMPLE 6

A light magenta ink was prepared in the same manner as in Example 1 except for using the following components.

[Formulation of Light Magenta Ink LM-101]

| (Solid Contents) | |
|---|---|
| Magenta Dye (a-36) | 7.5 g/liter |
| Benzotriazole (BTZ) | 0.08 g/liter |
| PROXEL XL2 | 3.5 g/liter |
| (Liquid Components) | |
| Diethylene glycol (DEG) | 120 g/liter |
| Glycerin (GR) | 100 g/liter |
| Triethylene glycol monobutyl ether (TGB) | 100 g/liter |
| 2-Pyrrolidone (PRD) | 90 g/liter |
| Triethanolamine (TEA) | 6.9 g/liter |
| Surfynol STG (SW) | 10 g/liter |

Inks LM-102 to LM-106 were prepared by changing the solvent species of LM-101 as shown in the Table below.

| | LM-101 | LM-102 | LM-103 | LM-104 | LM-105 | LM-106 |
|---|---|---|---|---|---|---|
| a-36 | 7.5 g | 7.5 g | 7.5 g | 7.5 g | 7.5 g | 7.5 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 120 g | 120 g | 120 g | 120 g | 50 g | 140 g |
| GR | 100 g | 100 g | 100 g | 100 g | 100 g | 100 g |
| TGB | 100 g | 100 g | 100 g | 100 g | 50 g | — |
| PRD | 90 g | — | — | — | — | — |
| TEA | 6.9 g | 6.9 g | 6.9 g | 6.9 g | 6.9 g | 6.9 g |
| SW | 10 g | 10 g | 10 g | 10 g | 10 g | 10 g |
| DMI | — | 90 g | — | — | — | — |
| DMAc | — | — | 90 g | — | — | — |
| MFG | — | — | — | 90 g | — | — |
| DEB | — | — | — | — | 90 g | 130 g |
| Finished amount* | 1 liter | 1 liter | 1 liter | 1 liter | 1 liter | 1 liter |

*All were made to a finished amount of 1 liter by adding water.
DMI: 1,3-Dimethylimidazolidinone
DMAc: N,N-dimethylacetamide
MFG: 1-Methoxy-2-propanol
DEB: Diethylene glycol monobutyl ether Also, Magenta Ink Solution M-101 was prepared by increasing Magenta Dye (a-36) to 23 g in the formulation above.

[Formulation of Magenta Ink M-101]

| (Solid Contents) | |
|---|---|
| Magenta Dye (a-36) | 23 g/liter |
| Benzotriazole (BTZ) | 0.08 g/liter |
| PROXEL XL2 | 3.5 g/liter |
| (Liquid Components) | |
| Diethylene glycol (DEG) | 120 g/liter |
| Glycerin (GR) | 100 g/liter |
| Triethylene glycol monobutyl ether (TGB) | 100 g/liter |
| 2-Pyrrolidone (PRD) | 90 g/liter |

-continued

| | |
|---|---|
| Triethanolamine (TEA) | 6.9 g/liter |
| Surfynol STG (SW) | 10 g/liter |

Magenta Inks M-102 to M-106 were prepared by changing the ink formulation of M-101 as shown in the Table below.

| | M-101 | M-102 | M-103 | M-104 | M-105 | M-106 |
|---|---|---|---|---|---|---|
| a-36 | 23 g | 23 g | 23 g | 23 g | 23 g | 23 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 150 g | — | 150 g | 50 g | 50 g | 50 g |
| GR | 130 g | 150 g | 100 g | 70 g | 70 g | 70 g |
| TGB | 130 g | 100 g | 150 g | 20 g | 20 g | 20 g |
| TEA | 6.9 g | 6.9 g | 6.9 g | 6.9 g | 6.9 g | 6.9 g |
| SW | 10 g | 10 g | 10 g | 10 g | 10 g | 10 g |
| DMI | — | 90 g | — | — | — | — |
| DMAc | — | — | 90 g | — | — | — |
| MFG | — | — | — | 90 g | — | — |
| DEB | — | — | — | — | 90 g | 130 g |
| Finished amount* | 1 liter | 1 liter | 1 liter | 1 liter | 1 liter | 1 liter |

*All were made to a finished amount of 1 liter by adding water.

These inks were evaluated on the ejection stability (ejection property) of ink, the image fastness and the blurring of image under high-humidity condition in the same manner as in Example 1.

The results obtained are shown in the Table below.

| | Ejection Stability | Light Fastness | Heat Fastness | O₃ Resistance | M Bleeding |
|---|---|---|---|---|---|
| Genuine ink of EPSON (PM-950) | A | C | B | C | B |
| LM-101, M-101 (Reference Example) | A | A | A | A | C |
| LM-102, M-102 (Reference Example) | A | A | A | A | C |
| LM-103, M-103 (Reference Example) | A | A | A | A | C |
| LM-104, M-104 (Invention) | A | A | A | A | A |
| LM-105, M-105 (Invention) | A | A | A | A | A |
| LM-106, M-106 (Invention) | A | A | A | A | A |

As seen from the results in the Table, the systems using the ink set of the present invention were decreased in the bleeding as compared with Reference Examples and also surpassed the genuine ink of EPSON in view of both the fastness of image and the blurring of image.

EXAMPLE 7

[Preparation of Light Magenta Ink]

A light magenta ink was prepared in the same manner as in Example 1 except for using the following components.

| | |
|---|---|
| Magenta Dye (a-36) | 10.2 g/liter |
| Triethylene glycol monobutyl ether | 130.0 g/liter |
| Glycerin | 130.0 g/liter |
| Diethylene glycol | 150.0 g/liter |
| Urea | 37.0 g/liter |
| PROXEL XL2 [produced by Zeneca] | 5.0 g/liter |
| Benzotriazole | 0.07 g/liter |
| Surfactant (polyethylene glycol (average number of repetitions of ethylene oxide: 10) terminated with 2-butyl octanoic acid ester at one end) | 6.0 g/liter |

[Preparation of Magenta Ink]

A magenta ink was prepared in the same manner as in Example 1 except for using the following components.

| | |
|---|---|
| Magenta Dye (a-36) | 30.8 g/liter |
| Triethylene glycol monobutyl ether | 140.0 g/liter |
| Glycerin | 160.0 g/liter |
| Diethylene glycol | 110.0 g/liter |
| Urea | 46.0 g/liter |
| PROXEL XL2 [produced by Zeneca] | 4.5 g/liter |
| Benzotriazole | 0.08 g/liter |
| Surfactant (polyethylene glycol (average number of repetitions of ethylene oxide: 10) terminated with 2-butyl octanoic acid ester at one end) | 12.0 g/liter |

Then, inks of Examples 8 and 9 and Comparative Examples 1 and 2 were prepared in the same manner as the light magenta ink and magenta ink of Example 7 except for changing the dye, water-miscible organic solvent species and amount as shown in the Table below.

| | Composition | Light Magenta | Magenta | Vapor Pressure [Pa] |
|---|---|---|---|---|
| Example 7 | Dye | (a-36) | (a-36) | — |
| | Diethylene glycol | 150 | 110 | <1.3 (20° C.) |
| | Glycerin | 130 | 160 | 0.3 (20° C.) |
| | Triethylene glycol monobutyl ether | 130 | 140 | <1.3 (20° C.) |
| Example 8 | Dye | (a-36) | (a-36) | — |
| | Diethylene glycol | 47 | 76 | <1.3 (20° C.) |
| | Glycerin | 198 | 150 | 0.3 (20° C.) |
| | Triethylene glycol monobutyl ether | 105 | 107 | <1.3 (20° C.) |
| Example 9 | Dye | (a-36) | (a-36) | — |
| | Diethylene glycol | 150 | 110 | <1.3 (20° C.) |
| | Glycerin | 130 | 160 | 0.3 (20° C.) |
| | 1-Methoxy-2-propanol | 130 | 140 | 1013 (20° C.) |
| Comparative Example 1 | Dye | (B-1) | (B-2) | — |
| | Diethylene glycol | 150 | 110 | <1.3 (20° C.) |
| | Glycerin | 130 | 160 | 0.3 (20° C.) |
| | Triethylene glycol monobutyl ether | 130 | 140 | <1.3 (20° C.) |
| Comparative Example 2 | Dye | (154) | (154) | — |
| | 2-Propanol | 215 | 190 | 4320 (20° C.) |
| | Ethylene glycol dimethyl ether | 195 | 220 | 6400 (20° C.) |

-continued

| Composition | Light Magenta | Magenta | Vapor Pressure [Pa] |
|---|---|---|---|

B-1

B-2

(Inkjet Recording)

These ink sets each was filled in cartridges of Inkjet Printer PM920C (manufactured by Seiko Epson Corporation) and an image was printed by this printer on inkjet paper Photo Gloss Paper EX produced by Fuji Photo Film Co., Ltd. and subjected to the following evaluations.

(1) As for the ejection stability, cartridges were set in the printer and by performing a continuous ejection test of ink from nozzles, the ejection stability (1) was evaluated.

Furthermore, the ejection stability (2) after the printer was left standing at room temperature for 2 weeks in the state that the cartridges were set in the printer was also evaluated.

○: Stable.
Δ: Slightly unstable.
×: Unstable.

(2) As for the image preservability, a magenta solid image printed sample was prepared and subjected to the following evaluations.

In the evaluation of light fastness, the image density Ci immediately after printing was measured by a reflection densitometer (X-Rite 310TR) and after the image was irradiated with xenon light (85,000 lx) for 6 days by using a weather meter manufactured by Atlas, the image density Cf was again measured. Then, the dye residual ratio (100× Cf/Ci) was determined and evaluated. The dye residual ratio was evaluated at three points having a reflection density of 1, 1.5 and 2. The sample was rated A when the dye residual ratio was 80% or more at any density, rated B when less than 80% at two points, and rated C when less than 80% at all points.

In the evaluation of heat fastness, the density was measured by a reflection densitometer (X-Rite 310TR) before and after the sample was stored for 5 days under the conditions of 80° C. and 70% RH and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

The ozone resistance was evaluated in the same manner as in Example 2.

The results obtained are shown in the Table below.

| Ink | Dye | Ejection Stability (1) | Ejection Stability (2) | Light Fastness | Heat Fastness | Ozone Resistance |
|---|---|---|---|---|---|---|
| Example 7 | (a-36) | ○ | ○ | A | A | A |
| Example 8 | (a-36) | ○ | ○ | A | A | A |
| Example 9 | (a-36) | ○ | ○ | A | A | A |
| Comparative Example 1 | (B-1), (B-2) | ○ | ○ | C | A | C |
| Comparative Example 2 | (a-36) | ○ | X | A | A | A |

It is seen that when the ink of the present invention is used, excellent ejection stability can be obtained and excellent performance is exhibited regarding the fastness.

The color hue obtained by the inks of the present invention was equal to that of the ink of Comparative Example 1.

Also, when inks of the present invention were prepared by using other water-soluble dyes represented by formula (1) in place of the magenta dye (a-36) in this Example, the same effects as above were obtained on the weather resistance, ejection stability and color hue.

Incidentally, even when the image-receiving paper used in the present invention was changed to PM Photographic Paper produced by Seiko Epson Corporation or PR101 produced by Canon Inc., the same effects as in the results above were obtained.

INDUSTRIAL APPLICABLITIY

The ink of the present invention is not limited in the inkjet recording system and can be used for a known system, for example, an electric charge controlling system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the pressure generated.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink, and the ink of the present invention can be used for all of these systems.

The invention claimed is:

1. An ink for ink jet recording, comprising an aqueous medium and a magenta dye dissolved or dispersed in the aqueous medium, the magenta dye being selected from azo dyes,
wherein the magenta dye has an oxidation potential of more positive than 1.0 V (vs SCE) and the ink comprises a water-miscible organic solvent having a vapor pressure of 2,000 Pa or less at 20° C., and the azo dye is a dye represented by the following formula (1):

Formula (1):

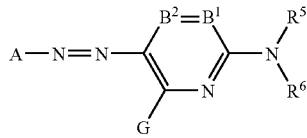

wherein A represents a 5-membered heterocyclic group;

B¹ and B² each represents =CR¹— or —CR²= either or one of B¹ and B² represents a nitrogen atom and other represents =CR¹— or —CR²=;

R⁵ and R⁶ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, R¹ and R² each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and R¹ and R⁵, or R⁵ and R⁶ may combine to form a 5- or 6-membered ring.

2. The ink for inkjet recording according to claim 1, wherein the ink comprises at least one organic solvent having a boiling point of 150° C. or more as the water-miscible organic solvent.

3. The ink for inkjet recording according to claim 2, wherein at least one of the organic solvent having a boiling point of 150° C. or more is an alcohol derivative.

4. The ink for inkjet recording according to claim 1, wherein the ink comprises at least one organic solvent having a boiling point of less than 150° C. as the water-miscible organic solvent.

5. The ink for inkjet recording according to claim 4, wherein at least one of the organic solvent having a boiling point of less than 150° C. is an alcohol derivative.

6. The ink for inkjet recording according to claim 1, wherein the ink comprises a polyhydric alcohol and/or a derivative of the polyhydric alcohol as the water-miscible organic solvent.

7. The ink for inkjet recording according to claim 6, wherein the ink comprises two or more mixture comprising the polyhydric alcohol and/or the derivative of the polyhydric alcohol.

8. The ink for inkjet recording according to claim 6, wherein comprises the polyhydric alcohol and/or the derivative of the polyhydric alcohol at a concentration of 10 to 60 (weight/volume) %.

9. The ink for inkjet recording according to claim 1, wherein the ink comprises the water-miscible organic solvent in which the azo dye has a solubility of 10 (g/100 g-solvent) or more at 25° C.

10. The ink for inkjet recording according to claim 9, wherein the ink comprises the water-miscible organic solvent in an amount of 10 weight % or less, the azo dye having a solubility of 10 (g/100 g-solvent) or more at 25° C. in the water-miscible organic solvent.

11. The ink for inkjet recording according to claim 1, wherein the ink comprises the organic solvent as the water-miscible organic solvent, the organic solvent being liquid at a room temperature and not containing a heteroatom other than an oxygen atom.

12. The ink for inkjet recording according to claim 11, wherein the organic solvent has a boiling point of 150° C. or more.

13. The ink for inkjet recording according to claim 11, wherein the organic solvent is an alcohol derivative selected from a monool, a diol and a triol.

14. The ink for inkjet recording according to claim 1, wherein the ink comprises a water of from 40 to 80 weight % of a ink solution.

15. The ink for inkjet recording according to claim 1, wherein the azo dye has an absorption maximum in the spectral region of 500 to 580 nm in the aqueous medium.

16. The ink for inkjet recording according to claim 1, wherein the azo dye has one of an aromatic ring amino group and a heterocyclic amino group-containing structure as an auxochrome.

17. The ink for inkjet recording according to claim 1, wherein the azo dye has a stereo structure.

18. The ink for inkjet recording according to claim 1, wherein the ink has an ozone fading rate constant of a recorded image is $5.0 \times 10^{-2}$ or less.

19. A method for inkjet recording using the ink for inkjet recording according to claim 1.

20. A method for inkjet recording, comprising steps of: ejecting an ink droplet in accordance with a recording signal on an image-receiving material, the image-receiving material comprising an image-receiving layer that contains a white inorganic pigment particle on a support; and recording an image on the image-receiving material, wherein the ink droplet is the ink for inkjet recording according to claim 1.

* * * * *